US009644985B2

(12) United States Patent
Takei et al.

(10) Patent No.: US 9,644,985 B2
(45) Date of Patent: May 9, 2017

(54) NAVIGATION DEVICE THAT EVALUATES POINTS OF INTEREST BASED ON USER UTTERANCE

(71) Applicants: Takumi Takei, Tokyo (JP); Yuki Furumoto, Tokyo (JP)

(72) Inventors: Takumi Takei, Tokyo (JP); Yuki Furumoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 132 days.

(21) Appl. No.: 14/422,602

(22) PCT Filed: Oct. 10, 2012

(86) PCT No.: PCT/JP2012/076206
§ 371 (c)(1),
(2) Date: Feb. 19, 2015

(87) PCT Pub. No.: WO2014/057540
PCT Pub. Date: Apr. 17, 2014

(65) Prior Publication Data
US 2015/0226570 A1   Aug. 13, 2015

(51) Int. Cl.
*G01C 21/36*   (2006.01)
*G09B 29/00*   (2006.01)
(Continued)

(52) U.S. Cl.
CPC ..... *G01C 21/3667* (2013.01); *G01C 21/3484* (2013.01); *G01C 21/3608* (2013.01);
(Continued)

(58) Field of Classification Search
CPC ....................................................... G10L 25/63
See application file for complete search history.

(56) References Cited

U.S. PATENT DOCUMENTS 8,214,214 B2 *  7/2012  Bennett ................. G10L 15/30
704/254
8,306,641 B2 * 11/2012  Jonsson ................ G01C 21/20
700/94

(Continued)

FOREIGN PATENT DOCUMENTS

JP   3708141 B2   10/2005
JP   3752159 B2   3/2006
(Continued)

*Primary Examiner* — Todd Melton
(74) *Attorney, Agent, or Firm* — Birch, Stewart, Kolasch & Birch, LLP

(57) ABSTRACT

Because a navigation device that provides guidance on a moving route and displays map data on a display screen on the basis of the map data and the position of a moving object automatically acquires evaluation information for a point or a region from a recognition result and position information, and registers the evaluation information, the navigation device can leave an impression (evaluation) of the point or the region automatically and safely without requiring the user's special operation. Further, by adding the evaluation information to map data and displaying this map data at the time of use, the navigation device enables the user to revisit a point through which the user desires to pass once again, bypass a point through which the user desires to never pass again, and so on without requiring the user's work of consciously memorizing the impression of each point.

15 Claims, 34 Drawing Sheets

(51) Int. Cl.
    *G10L 15/05*     (2013.01)
    *G10L 15/22*     (2006.01)
    *G01C 21/34*     (2006.01)
    *G09B 29/10*     (2006.01)
    *G10L 15/08*     (2006.01)

(52) U.S. Cl.
    CPC ..... *G01C 21/3641* (2013.01); *G01C 21/3697* (2013.01); *G09B 29/007* (2013.01); *G09B 29/10* (2013.01); *G10L 15/05* (2013.01); *G10L 2015/088* (2013.01); *G10L 2015/228* (2013.01)

(56) References Cited

U.S. PATENT DOCUMENTS

| | | | |
|---|---|---|---|
| 8,635,237 B2 * | 1/2014 | Bansal | G06F 17/30864 704/231 |
| 2009/0143977 A1 * | 6/2009 | Beletski | G01C 21/362 701/533 |
| 2012/0117060 A1 * | 5/2012 | Matsuyama | G06F 17/30867 707/733 |

FOREIGN PATENT DOCUMENTS

| | | |
|---|---|---|
| JP | 2006-251298 A | 9/2006 |
| JP | 2007-255897 A | 10/2007 |
| JP | 2008-196998 A | 8/2008 |
| JP | 2009-180675 A | 8/2009 |
| JP | 2011-4143 A | 1/2011 |
| JP | 2011-179917 A | 9/2011 |
| JP | 2011-203455 A | 10/2011 |
| JP | 2013-200684 A | 10/2013 |

* cited by examiner

FIG.2

| "Good" | "Bad" |
|---|---|
| Beautiful | Dirty |
| Wide | Narrow |
| Easy to Drive | Hard to Drive |
| ⋮ | ⋮ |

FIG.31

| "Good" | "Bad" |
|---|---|
| Beautiful | Dirty |
| Wide | Narrow |
| Easy to Drive | Hard to Drive |
| Oh | Oh |
| Wow | Wow |
| ⋮ | ⋮ |

NAVIGATION DEVICE THAT EVALUATES POINTS OF INTEREST BASED ON USER UTTERANCE

FIELD OF THE INVENTION

The present invention relates to a navigation device that can recognize a voice uttered by a user and register an evaluation of a point which the user has visited, and a server for navigation.

BACKGROUND OF THE INVENTION

Generally, there is a case in which the user has a good impression or a bad impression on a road along which the user is passing (or surroundings of the road) during driving or the like, and it is therefore convenient if the user can leave behind the information. However, it is difficult for the user itself to memorize the road along which the user has passed, and its surrounding environment, and it is also troublesome to perform a point registration each time by using a car navigation system or the like.

Further, in general, a navigation device, such as a vehicle-mounted one, has pieces of facility information stored in advance with map data, and can provide guidance on a route to a predetermined facility and present the existence of facilities using graphics and characters on a map. On the other hand, there is a navigation device that, in addition to those pieces of facility information, has a point registration function of allowing the user to register an arbitrary point. A problem with the navigation device is that although this navigation device can similarly provide guidance on an arbitrary point, and present the existence of registrations, it is troublesome to perform a point registration each time by using a car navigation system or the like and it is hard to use the navigation device for uses such as a use accompanied by a desire to leave the impression of a point freely.

A technique of, in an information storage device mounted in a moving object, analyzing the contents of a passenger's utterance from a voice in the moving object in which this device is mounted by using a voice recognition technology, and recording a comment for a target object to solve the above-mentioned problem is known. For example, in patent reference 1, a technique of leaving a comment for a target object by using a word indicating the target object in an utterance and a word describing the target object is described.

RELATED ART DOCUMENT

Patent Reference

Patent reference 1: Japanese Unexamined Patent Application Publication No. 2011-179917

SUMMARY OF THE INVENTION

Problems to be Solved by the Invention

However, actually, there is a case in which when a passenger utters in a moving object and leaves a comment, he or she omits some words indicating a target object and then utter, or utters an overall impression not just on a specific thing, but on a surrounding environment or the like. In such a case, according to a conventional technology as described in patent reference 1, no comment can be left as expected.

Further, a problem with the conventional device as described in patent reference 1 is that because the use of a comment is limited to that at a time of making a facility search, and therefore a target position needs to be a point for which the user can search in order to use the comment, it takes time for the user to specify a location intentionally, and the user cannot easily grasp a positional relationship between the current position of the vehicle (moving object) and the location. A further problem is that because text data into which the contents of an utterance are converted is recorded as the comment, or voice data itself is recorded as the comment, just as it is, it is difficult for the user to check the contents in an instant.

The present invention is made in order to solve the above-mentioned problems, and it is therefore an object of the present invention to provide a navigation device that can regularly recognize a voice uttered by a user, automatically register an evaluation of a point which the user has visited, and present the evaluation to the user with safety and effectively, and a server for navigation.

Means for Solving the Problem

In order to achieve the above-mentioned object, in accordance with the present invention, there is provided a navigation device that provides guidance on a moving route and displays map data on a display screen on the basis of map data and the position of a moving object, the navigation device including: a sound acquiring unit that acquires a sound signal; an utterance section detector that detects an utterance section of a user's uttered voice from the sound signal acquired by the above-mentioned sound acquiring unit to extract voice data; a voice recognizer that regularly recognizes the voice data extracted by the above-mentioned utterance section detector to extract a predetermined key word after the above-mentioned navigation device has been started; an evaluation information acquiring unit that refers to an evaluation information correspondence table in which a plurality of key words are brought into correspondence with an evaluation for each of the above-mentioned key words in advance to acquire evaluation information corresponding to the predetermined key word extracted by the above-mentioned voice recognizer; a current position acquiring unit that acquires the current position of the above-mentioned moving object; an evaluation information with position generator that combines the evaluation information acquired by the above-mentioned evaluation information acquiring unit and the current position acquired by the above-mentioned current position acquiring unit to generate evaluation information with position; an evaluation information with position storage that stores the evaluation information with position generated by the above-mentioned evaluation information with position generator; and a map display unit that adds predetermined evaluation information with position stored in the above-mentioned evaluation information with position storage to the above-mentioned map data, and that also displays the map data to which the above-mentioned evaluation information with position is added on the above-mentioned display screen.

Advantages of the Invention

Because the navigation device in accordance with the present invention generates evaluation information with position by converting an utterance on which the navigation device regularly performs voice recognition into evaluation information and mapping this evaluation information onto position information, and adds the evaluation information with position to map data and displays this map data, the evaluation information with position can be stored regularly and automatically, and safely, and can be presented to the user effectively.

BRIEF DESCRIPTION OF THE FIGURES

FIG. 2 is an example of an evaluation information correspondence table in which each of key words is brought into correspondence with evaluation information;

FIG. 31 is another example of the evaluation information correspondence table in which each of key words is brought into correspondence with evaluation information;

EMBODIMENTS OF THE INVENTION

Hereafter, the preferred embodiments of the present invention will be explained in detail with reference to the drawings.

Embodiment 1

In accordance with the present invention, there is provided a navigation device that provides guidance on a moving route and displays map data on a display (display screen) on the basis of map data and the position of a vehicle (moving object), in which evaluation information is specified from a recognition result acquired by regularly recognizing the contents of a user's (a passenger's) utterance, the evaluation information which is automatically linked with a point on the basis of the position information and the evaluation information is stored, and the information is presented to the user (passenger).

Figure 1:
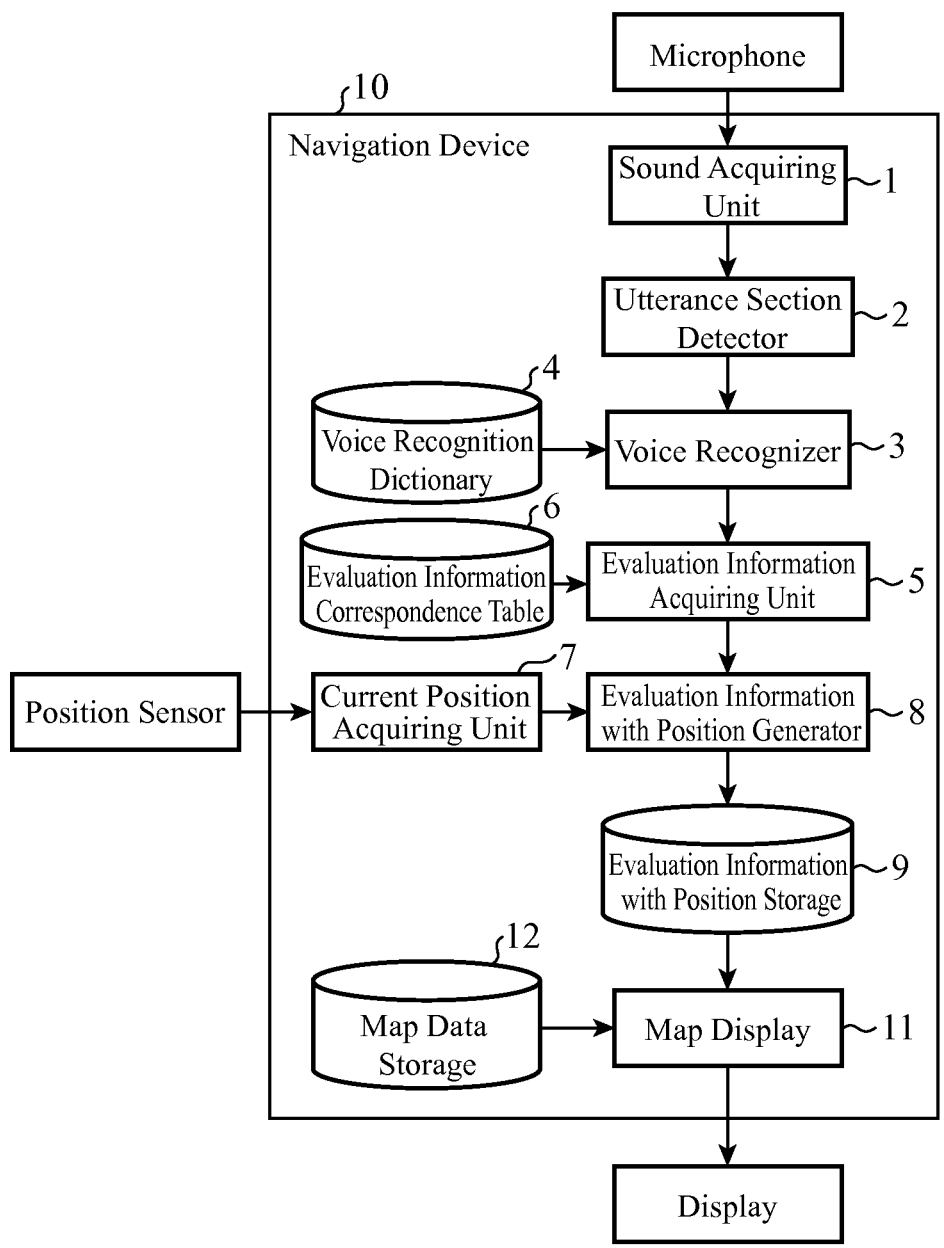
FIG. 1 is a block diagram showing an example of a navigation device in accordance with Embodiment 1.

FIG. 1 is a block diagram showing an example of a navigation device in accordance with Embodiment 1 of the present invention. This navigation device 10 is comprised of a sound acquiring unit 1, an utterance section detector 2, a voice recognizer 3, a voice recognition dictionary 4, an evaluation information acquiring unit 5, an evaluation information correspondence table 6, a current position acquiring unit 7, an evaluation information with position generator 8, an evaluation information with position storage 9, a map display unit 11, and a map data storage 12. Further, although not illustrated, this navigation device 10 also includes a key input unit that acquires an input signal generated by a key, a touch panel, or the like, and a sound outputter that can sound a voice or a sound effect via a speaker or the like.

The sound acquiring unit 1 A/D converts a sound collected by a microphone or the like to acquire a sound signal in, for example, a PCM (Pulse Code Modulation) form. The sound acquiring unit acquires a user's uttered voice, a sound in the surroundings of a vehicle (moving object), and so on as a sound signal.

The utterance section detector 2 detects an utterance section of a voice corresponding to the contents of an utterance made by a user, such as a fellow passenger, from the sound signal acquired by the sound acquiring unit 1, to extract the utterance section as voice data of this section.

The voice recognizer 3 has the voice recognition dictionary 4, extracts a feature quantity from the voice data extracted by the utterance section detector 2, and performs a voice recognition process by using the voice recognition dictionary 4 on the basis of the feature quantity to extract a predetermined key word. In this case, the recognition process can be carried out by using, for example, a typical method such as an HMM (Hidden Markov Model) method. Further, the voice recognizer 3 can use a voice recognition server on a network.

The voice recognition dictionary 4 is constructed in such a way that a key word for use in an acquiring process performed by the evaluation information acquiring unit 5, which will be mentioned below, can be recognized, and the voice recognizer 3 outputs this key word as a recognition result (referred to as a "recognition key word" from here on).

By the way, in a voice recognition function mounted in a car navigation system and so on, it is general that a passenger (user) specifies (commands) a start of utterance or the like to the system. Therefore, a button or the like for commanding a voice recognition start (referred to as a "voice recognition start commander" from here on) is displayed on a touch panel or placed on a steering wheel. Then, after the voice recognition start commander is pressed down by a passenger (user), an uttered voice is recognized. More specifically, when the voice recognition start commander outputs a voice recognition start signal and the voice recognition unit receives this signal, after this signal is received, an utterance section of a voice corresponding to the contents of the passenger's (user) utterance is detected from a sound signal, which is acquired by the sound acquiring unit, by the utterance section detector, and the above-mentioned recognition process is performed.

In contrast, the voice recognizer 3 in accordance with this Embodiment 1 regularly recognizes the contents of a user's utterance even if no voice recognition start command as above is provided by the user. More specifically, the voice recognizer 3 repeatedly carries out a process of, even if not receiving the voice recognition start signal, detecting an utterance section of a voice corresponding to the contents of a user's utterance from the sound signal acquired by the sound acquiring unit 1 by means of the utterance section detector 2, extracting a feature quantity of the voice data of this utterance section, performing a recognition process by using the voice recognition dictionary 4 on the basis of the feature quantity, and outputting a key word included in a voice recognition result. The same goes for the following embodiments.

The evaluation information acquiring unit 5 refers to the evaluation information correspondence table 6 in which a plurality of key words are brought into correspondence with an evaluation for each of these key words in advance to acquire evaluation information corresponding to the recognition key word extracted by the voice recognizer 3. An example of the definition of the evaluation information correspondence table 6 is shown in FIG. 2.

As shown in FIG. 2, the following key words: "beautiful", "wide", "easy to drive", and . . . are brought into correspondence with an evaluation of "good", and the following key words: "dirty", "narrow", "hard to drive", and . . . are brought into correspondence with an evaluation of "bad." For example, when a user's utterance is recognized and the key word "beautiful" is included in a result of the recognition, the evaluation information acquiring unit 5 refers to the evaluation information correspondence table 6 to acquire the corresponding evaluation information of "good." As a result, it is determined that the above-mentioned utterance corresponds to an act of making an evaluation of "good." Hereafter, an explanation will be made by assuming that one of the following two types of evaluations: "good" and "bad" are provided as the evaluation information.

The current position acquiring unit 7 acquires the current position of the vehicle (moving object) by using a position sensor. The current position acquiring unit acquires latitude and longitude, or the like as the position information. As the position sensor, a typical GPS (Global Positioning System) receiver, which is mounted in a car navigation system and a mobile phone, a gyroscope, or the like can be used.

The evaluation information with position generator 8 generates evaluation information with position by combining the evaluation information acquired by the evaluation information acquiring unit 5 and the current position information of the vehicle (moving object) acquired by the current position acquiring unit 7, and sends the evaluation information with position to the evaluation information with position storage 9.

More specifically, the evaluation information with position generated and sent thereto by the evaluation information with position generator 8 is stored and accumulated in the evaluation information with position storage 9.

The map display unit 11 newly generates map data with evaluation information by adding predetermined evaluation information with position stored in the evaluation information with position storage 9 to map data stored in the map data storage 12 which will be mentioned below, and displays the map data with evaluation information on a display (display screen). As a display area of the map, an area in the vicinity of the position of the vehicle (moving object) can be displayed, like that of a typical car navigation device, or an area in the vicinity of an arbitrary point specified by a user can be displayed, and the scale can be varied arbitrarily.

In the map data storage 12, for example, map data, such as road data, intersection data, and facility data, are stored in, for example, a medium, such as a DVD-ROM, a hard disk, or an SD card. Instead of this map data storage 12, a map data acquiring unit (not shown) that exists on a network and can acquire map data information, such as road data, via a communication network can be used. The same goes for the following embodiments.

Figure 3:
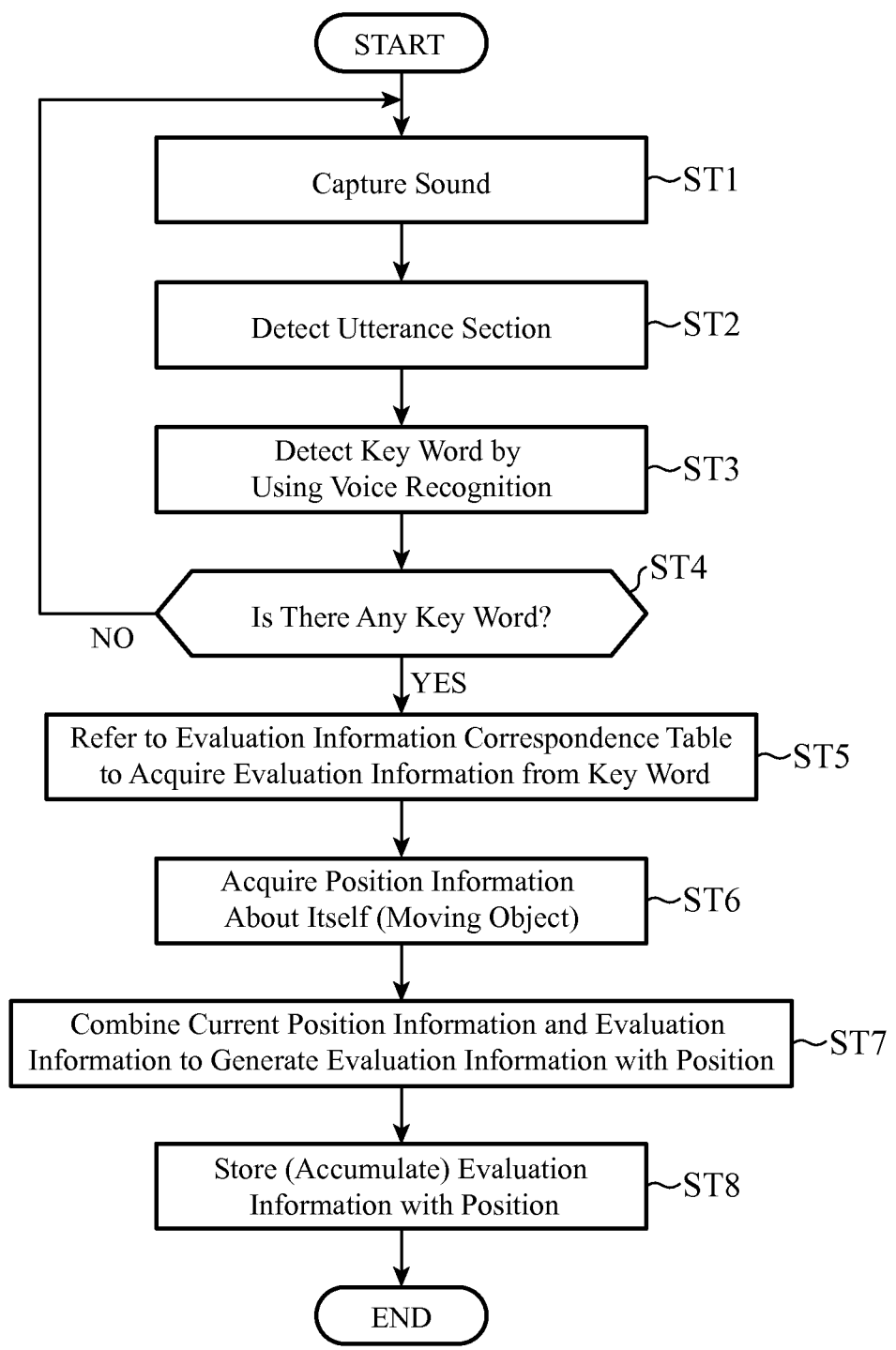
FIG. 3 is a flowchart showing an operation at the time of registration of evaluation information with position which is performed by the navigation device in accordance with Embodiment 1.
Figure 4:
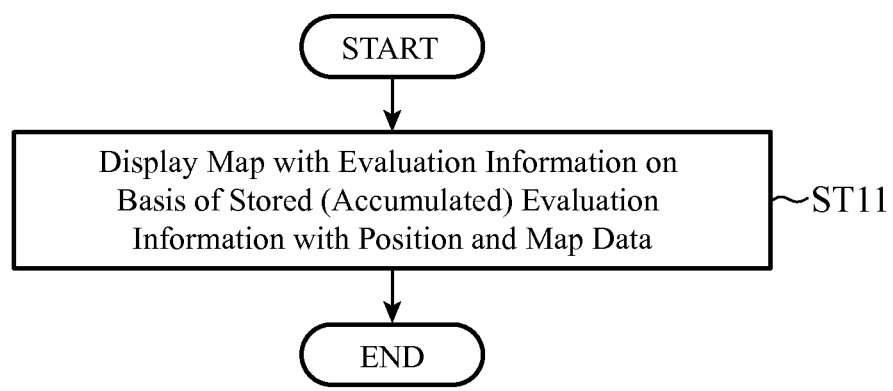
FIG. 4 is a flowchart showing an operation at the time of use of evaluation information with position which is performed by the navigation device in accordance with Embodiment 1.

Next, the operation of the navigation device in accordance with Embodiment 1 constructed as above will be explained. In order to illustrate the operation plainly, a process at the time of registration of evaluation information with position and a process at the time of use of evaluation information with position will be described separately. FIG. 3 is a flow chart showing the operation at the time of registration of evaluation information with position which is performed by the navigation device in accordance with Embodiment 1. Further, FIG. 4 is a flow chart showing the operation at the time of use of evaluation information with position which is performed by the navigation device in accordance with Embodiment 1. Because these two processes are regularly carried out in parallel, users do not consciously discriminate between them. The same goes for the following embodiments.

First, the operation at the time of registration will be explained with reference to FIG. 3. The sound acquiring unit 1 acquires a sound inputted from the microphone, and A/D converts the sound to acquire a sound signal in, for example, a PCM form (step ST1). Next, the utterance section detector 2 detects an utterance section from the sound signal acquired by the sound acquiring unit 1, to extract voice data (step ST2). Next, the voice recognizer 3 recognizes the voice data extracted by the utterance section detector 2 by using the voice recognition dictionary 4, and detects a key word included in a result of the recognition (step ST3).

In this case, when no key word is included in the recognition result (when NO in step ST4), the navigation device skips subsequent processes and performs the above-mentioned processes of steps ST1 to ST3 again. In contrast, when a key word is included in the recognition result (when YES in step ST4), the evaluation information acquiring unit 5 refers to the evaluation information correspondence table 6 to acquire evaluation information corresponding to the above-mentioned key word (step ST5).

Next, the current position acquiring unit 7 acquires the current position information of the vehicle (moving object) on the basis of the information from the position sensor (step ST6). The evaluation information with position generator 8 then combines the evaluation information acquired by the evaluation information acquiring unit 5 in step ST5 and the current position information acquired by the current position acquiring unit 7 in step ST6, to generate evaluation information with position (step ST7), and sends this evaluation information with position to the evaluation information with position storage 9, so that the evaluation information with position is stored in the evaluation information with position storage 9 (step ST8). More specifically, the point for which the evaluation is made is linked with the evaluation information acquired in step ST5, and is stored together with this evaluation information.

As mentioned above, because the navigation device is constructed in such a way as to regularly recognize a user's utterance, the navigation device repeats the series of processes at the time of registration so as to prepare for the user's next utterance by restarting the sound capturing process of step ST1 which is performed by the sound acquiring unit 1.

Next, the operation at the time of use will be explained with reference to FIG. 4. The map display unit 11 displays a map with evaluation information on the display screen, such as the display, on the basis of both the map data stored in the map data storage 12 in advance, and the evaluation information with position, in step ST8 of FIG. 3, stored in the evaluation information with position storage 9, more specifically, by adding predetermined evaluation information with position stored in the evaluation information with position storage 9 to the map data stored in the map data storage 12 (step ST11).

Figure 5:
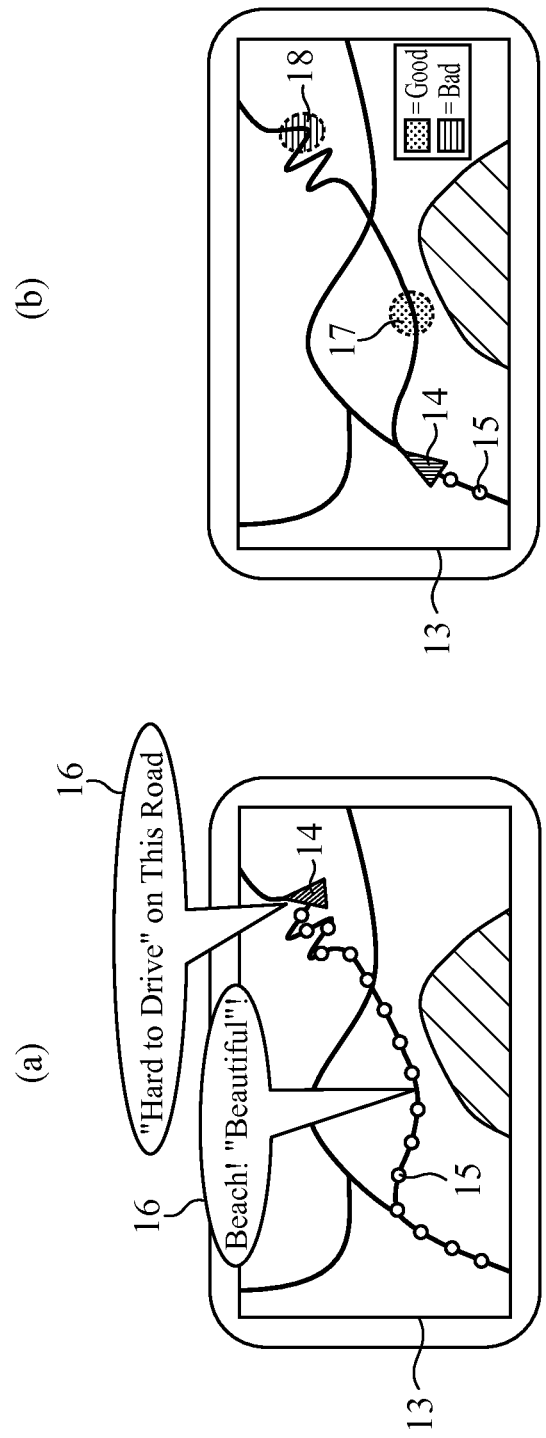
FIG. 5 is an explanatory drawing showing a concrete example of an operation at the time of registration (a) and an operation at the time of use (b) which are performed by the navigation device in accordance with Embodiment 1.

Hereafter, an explanation will be made by providing a concrete example. FIG. 5 is an explanatory drawing showing a concrete example of the operation at the time of registration (a) and the operation at the time of use (b) which are performed by the navigation device in accordance with Embodiment 1. In FIG. 5(a), on the map displayed on the display screen 13 of the navigation device 10, a plurality of path marks 15 showing the traveling path of the vehicle (moving object), and a balloon 16 showing the contents of a user's utterance at each point are illustrated in a state in which a vehicle mark 14 showing the position of the vehicle (moving object) is displayed. A hatched part in a central lower portion of the display screen 13 shows an ocean.

In this embodiment, for the sake of explanation, a state (FIG. 5(b)) of using evaluation information registered in FIG. 5(a) several days later is assumed.

First, the operation at the time of registration will be explained concretely with reference to FIG. 5(a). At the same time when the navigation device 10 is started, a sound input is started by the sound acquiring unit 1 (step ST1). For example, when a user looks at a beach by which he or she has passed and then utters "Beach, beautiful" in the state, voice data about this utterance section is acquired by the utterance section detector 2 (step ST2). The voice recognizer 3 then recognizes the voice data about this sound section, and refers to the voice recognition dictionary 4 to extract a key word "beautiful" on the basis of the recognition result of "Beach, beautiful" (step ST3).

The evaluation information acquiring unit 5 then refers to the evaluation information correspondence table 6 as shown in FIG. 2 (step ST4) to acquire evaluation information of "good" corresponding to the key word "beautiful" (step ST5). The point where the above-mentioned utterance is made is then acquired by the current position acquiring unit 7 (step ST6), and the evaluation information with position generator 8 combines this current position information with the evaluation information of "good" to generate evaluation information with position such as "east longitude of 135.12 degrees and north latitude of 34.41 degrees="good"" (step ST7), and stores this evaluation information with position in the evaluation information with position storage 9 (step ST8).

After that, for example, when the user utters "This road is hard to drive" or the like while passing along a road having many curves, the evaluation information with position generator newly generates evaluation information with position in the same way, and stores this evaluation information with position in the evaluation information with position storage 9 (steps ST1 to ST8). In this case, because a key word included in the recognition result is "hard to drive", the evaluation information is "bad."

Next, the operation at the time of use will be explained concretely with reference to FIG. 5(b). It is assumed that for example, the user will pass through the vicinity of the point for which the evaluation information was registered again several days later, as mentioned above. Then, when a map (FIG. 5(b)) including points at each of which already registered evaluation information with position was registered is displayed on the screen, for example, regions (17, 18) each of which is centered at the point for which the evaluation information with position was registered and has a fixed area, and to which a color or the like according to the type of the evaluation information is applied is superimposed and displayed on the map (step ST11). The navigation device can be constructed in such a way as to make it possible to refer to it at the time of a route setting to a destination by using the key input unit.

As a result, for example, when the vehicle (moving object) 14 is travelling before a branch point where it divides right and left branches, as shown in FIG. 5 (b), the user can confirm that the region 17 showing the evaluation information of "good" is displayed on the road on the right-hand side, feel strongly that "the road on the right-hand side looks good", and select the road on the right-hand side without hesitating on the branch road. Further, because the region 18 showing the evaluation information of "bad" is displayed ahead of the former region, the user can select a road bypassing the region at the next branch road and drive comfortably.

By doing in this way, the navigation device can save information about a road along which the user desires to pass again, information about a road along which the user does not desires to pass anymore, etc. without having to make the user operate intentionally, the navigation device can support the user's comfortable driving by, for example, preventing the user from repeating the same failure at the time of making a route selection, etc.

Figure 6:
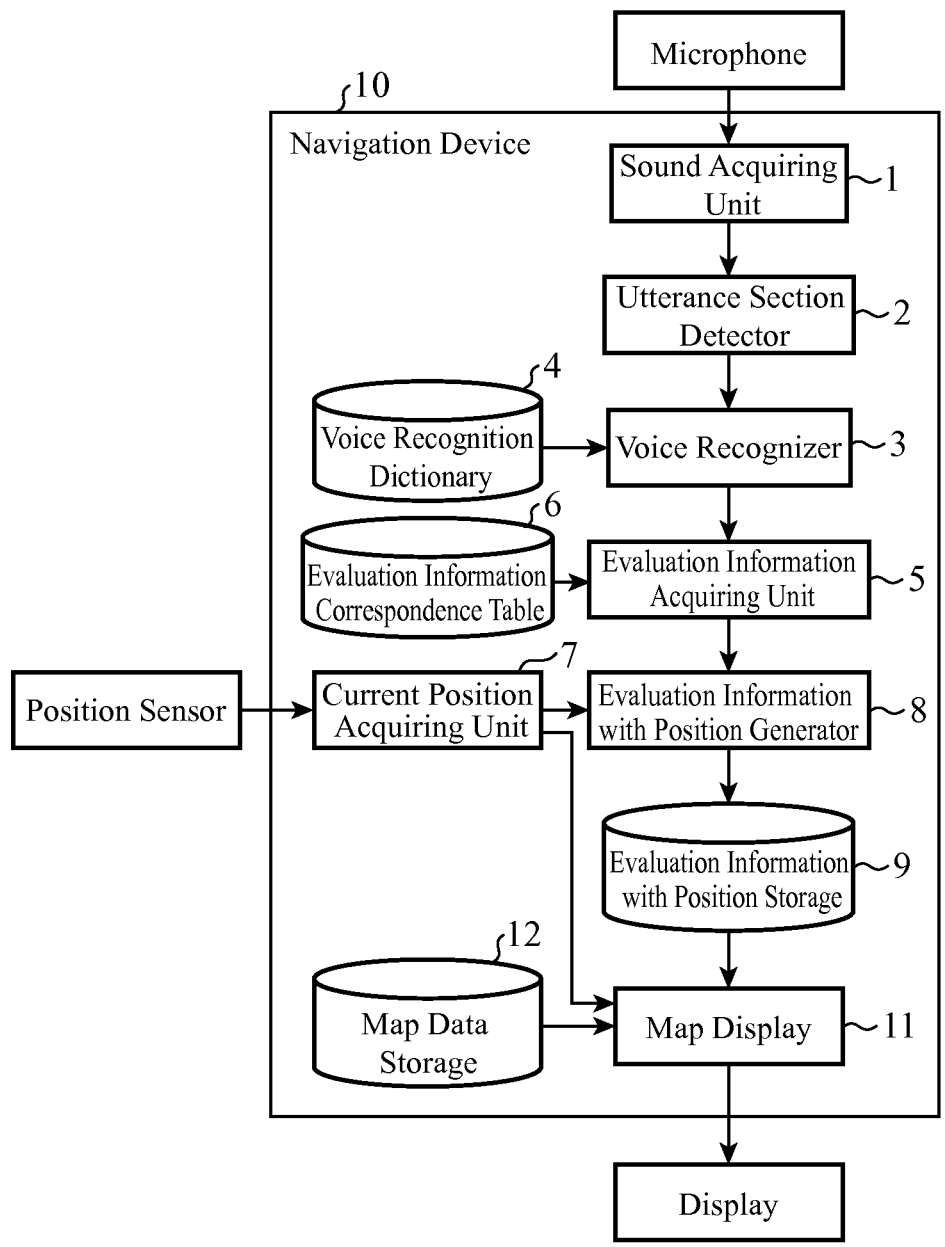
FIG. 6 is a block diagram showing another example of the navigation device in accordance with Embodiment 1.

Further, as shown in FIG. 6, the current position information acquired by the current position acquiring unit 7 can also be inputted to the map display unit 11. In this case, at the time of use of evaluation information with position, the map display unit 11 can display map data to which evaluation information with position is added on the display on the basis of both the current position acquired by the current position acquiring unit 7 and the evaluation information with position stored in the evaluation information with position storage 9 when the user passes through a point or a region for which the above-mentioned evaluation information with position is registered, or its neighborhood (for example, a certain threshold, such as an area having a radius of 50 m or less, can be determined, or the user can be enabled to specify the threshold), or only when it is already seen from the set route or the like that the user will pass through (is scheduled to pass through) the point or the region, or its neighborhood.

By doing in this way, the navigation device can prevent unnecessary information from being also presented to the user, thereby avoiding discomfort from being provided for the user.

At the time of presentation, the navigation device sounds by voice or by generating a sound effect according to the descriptions of the evaluation information with position and the position by using the above-mentioned sound outputter (not shown), thereby calling more understandable attention to the user.

Further, although the example in which a region to which a color or the like (a color, a pattern, or the like) according to evaluation information is applied is superimposed and displayed on the map is shown in this Embodiment 1, as the method of displaying a region on the map according to evaluation information, another method can be used, and the presentation to the user can be made by using a graphic, an image such as an icon, characters, or the like. Further, to a region, such as a prefecture, a city, ward, town, or village, or an address, including a point for which evaluation information with position is registered, a region according to the evaluation information can be assigned.

Figure 7:
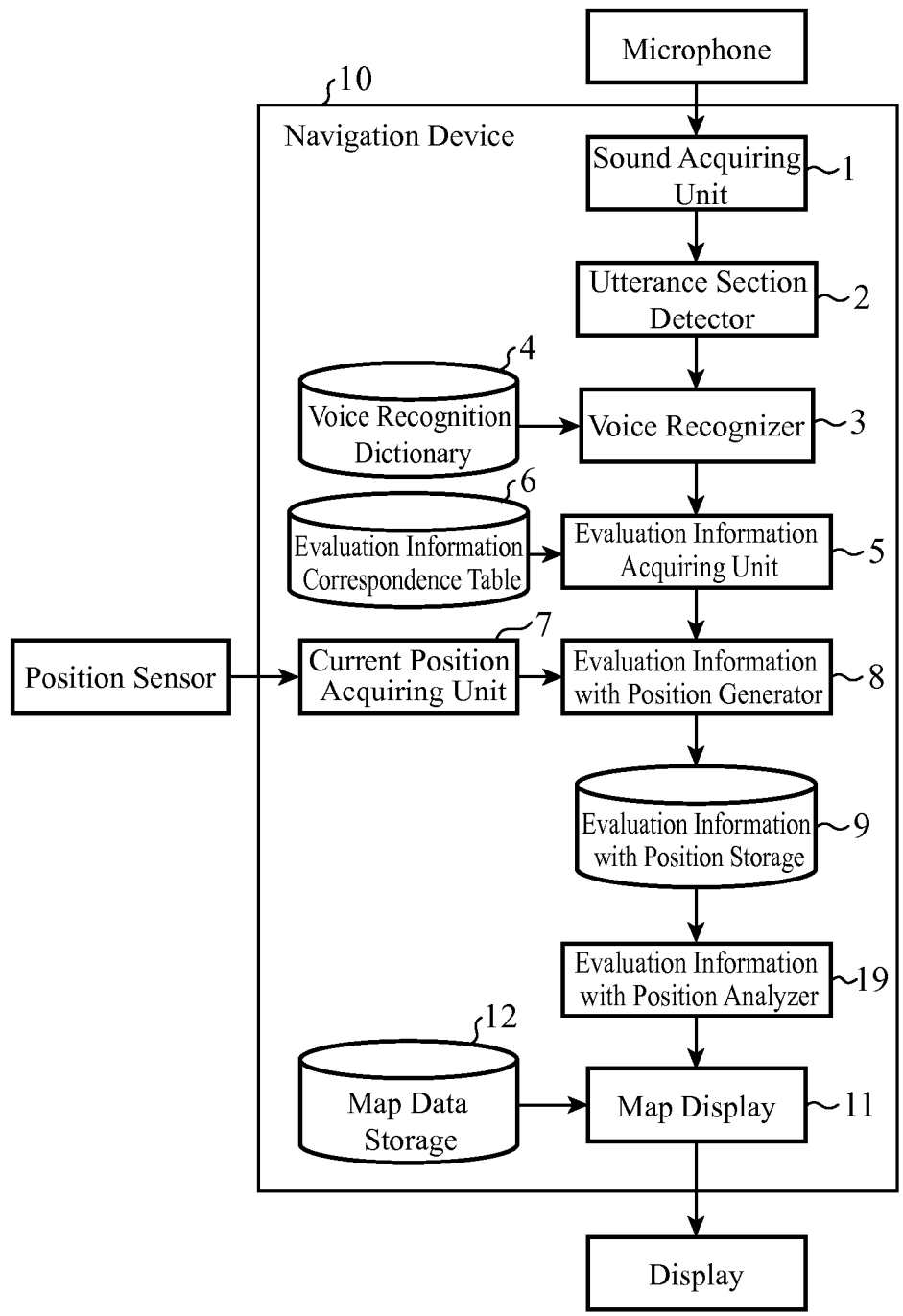
FIG. 7 is a block diagram showing a further example of the navigation device in accordance with Embodiment 1.

The navigation device can further include an evaluation information with position analyzer 19 that analyzes the number of pieces of evaluation information with position stored in the evaluation information with position storage 9, as shown in FIG. 7. In this case, at the time of use of evaluation information with position, the map display unit 11 can display map data to which evaluation information with position is added while changing the presenting method on the basis of an analysis result acquired by the evaluation information with position analyzer 19, more specifically, by taking into consideration the number of pieces of evaluation information with position, which is a result of the analysis, registered for each identical point or each identical region.

For example, by deepening the color, enlarging the characters, or the like with increase in the number, the map display unit presents the evaluation information with position in such a way that it is easy for the user to notice it and it is noticeable. Further, when different pieces of evaluation information with position are registered for an identical point or an identical region, one of these pieces of evaluation information with position whose number is the largest is presented. As an alternative, the pieces of evaluation information with position can be presented in intermediate representations according to their numbers.

As a result, the navigation device can make points where evaluations have been made concentratedly (points which seem to have a high use value) easily receive attention from the user.

As mentioned above, because the navigation device in accordance with this Embodiment 1 automatically acquires evaluation information for a point or a region from both a recognition result acquired by recognizing the contents of a user's utterance regularly, and the position information acquired by the position sensor, and registers the evaluation information, the navigation device can leave an impression (evaluation) of the point or the region automatically and safely without requiring the user's special operation. Further, by adding the evaluation information to map data and displaying this map data at the time of use, the navigation device enables the user to revisit a point through which the user desires to pass once again, bypass a point through which the user desires to never pass again, and so on without requiring the user's work of consciously memorizing the impression of each point and so on, thereby being able to support the user's comfortable movement.

Embodiment 2

Figure 8:
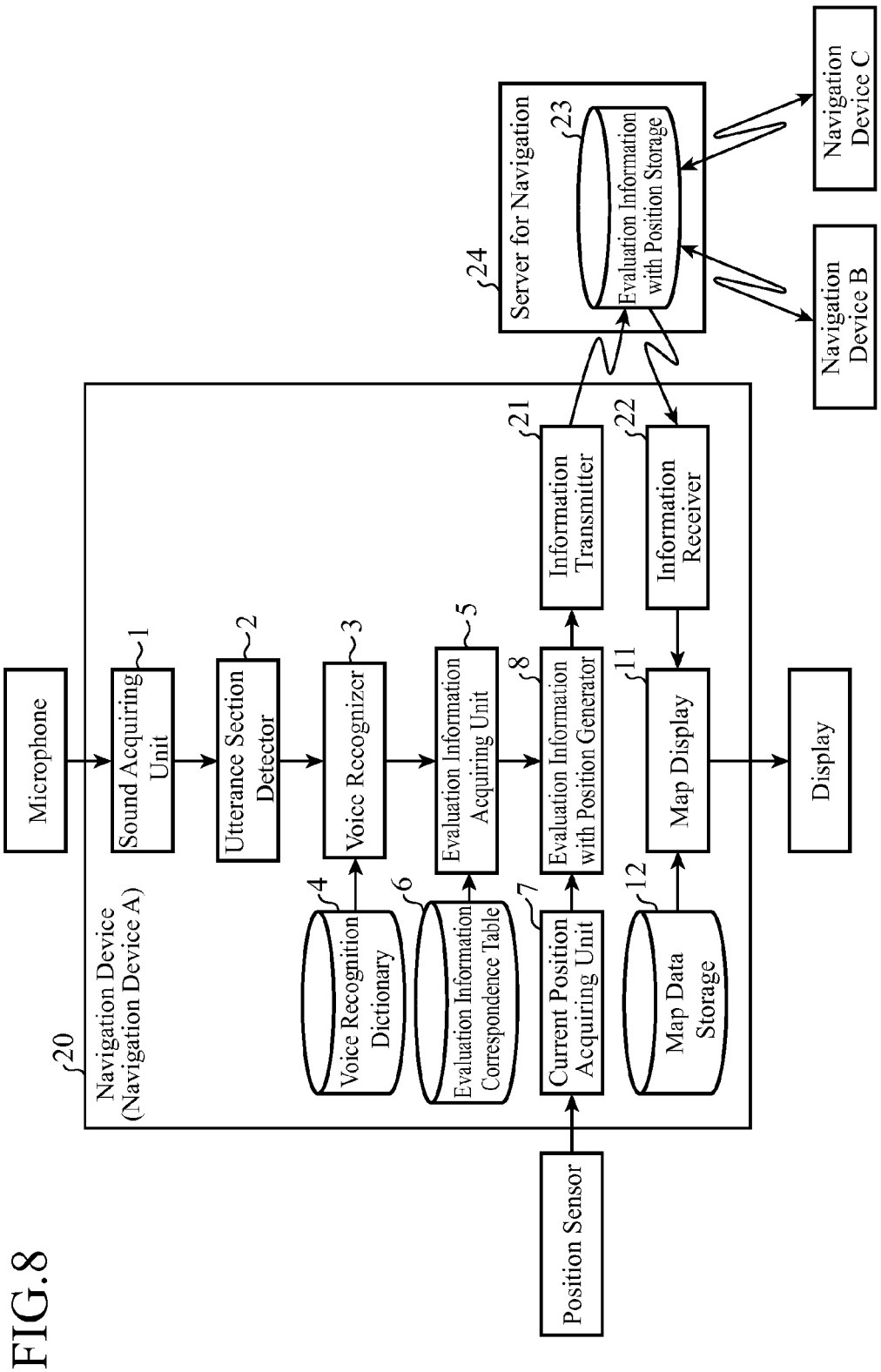
FIG. 8 is a block diagram showing an example of a navigation device in accordance with Embodiment 2.

FIG. 8 is a block diagram showing an example of a navigation device in accordance with Embodiment 2 of the present invention. The same structural components as those explained in Embodiment 1 are designated by the same reference numerals, and the duplicated explanation of the components will be omitted hereafter. The navigation device 20 in accordance with Embodiment 2 shown hereafter further includes an information transmitter 21 and an information receiver 22 as compared with the navigation device 10 in accordance with Embodiment 1. Further, by placing an evaluation information with position storage 23 on a server 24 for navigation, registration and use of evaluation information with position from a plurality of navigation devices in the evaluation information with position storage 23 are enabled.

The information transmitter 21 transmits evaluation information with position generated by an evaluation information with position generator 8 to the server 24 for navigation on a network via a communication network.

As a result, the evaluation information with position is stored in the evaluation information with position storage 23 which the server 24 for navigation has. Further, the information receiver 22 receives predetermined evaluation information with position from the server 24 for navigation on the network via the communication network.

The server 24 for navigation can transmit and receive information between itself and a plurality of navigation devices (for example, in the example of FIG. 8, navigation devices A, B, and C), and receives evaluation information with position from each of the plurality of navigation devices and stores the evaluation information with position in the evaluation information with position storage 23, and, when receiving a request from either one of the plurality of navigation devices, transmits evaluation information with position stored in the evaluation information with position storage 23 to the navigation device which has made the request.

A map display unit 11 newly generates map data with evaluation information and displays the map data on a display (display screen) on the basis of the received evaluation information with position and map data stored in a map data storage 12, more specifically, by adding the received predetermined evaluation information with position to map data stored in the map data storage 12. For increase in efficiency, the navigation device has only to receive only a difference from the server 24 for navigation by storing the evaluation information with position received from the server 24 for navigation in a storage medium (not shown), which the navigation device 20 has, once.

Figure 9:
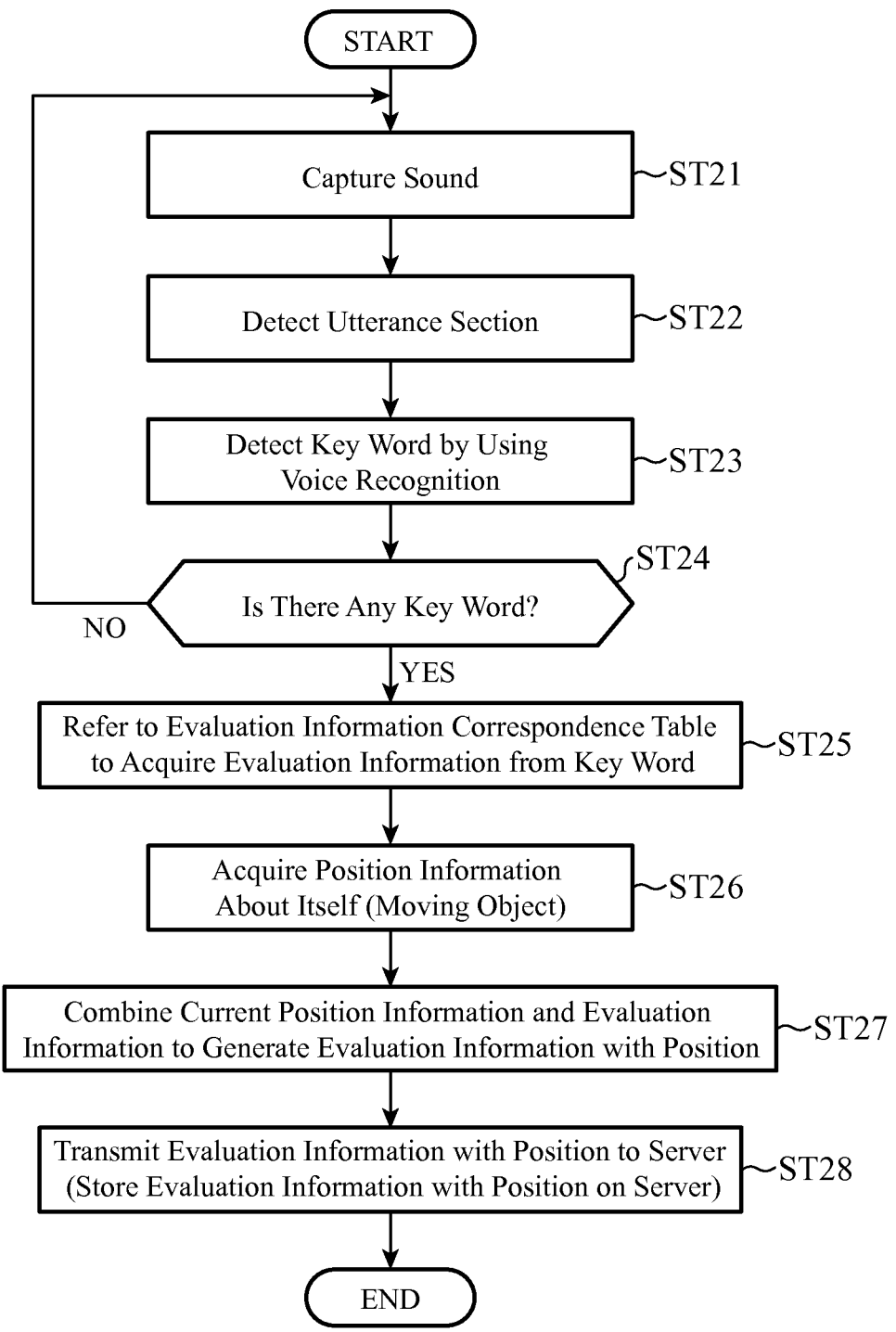
FIG. 9 is a flow chart showing an operation at the time of registration of evaluation information with position which is performed by the navigation device in accordance with Embodiment 2.
Figure 10:
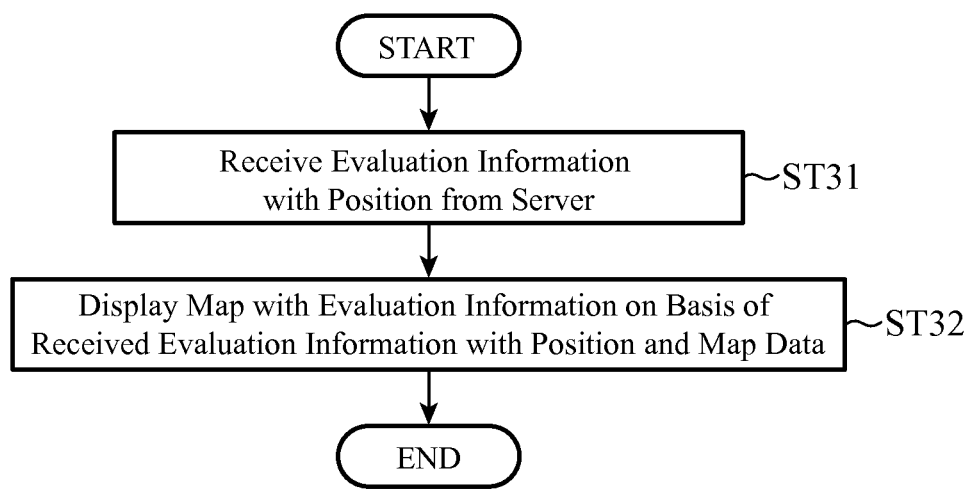
FIG. 10 is a flow chart showing an operation at the time of use of evaluation information with position which is performed by the navigation device in accordance with Embodiment 2.

Next, the operation of the navigation device in accordance with Embodiment 2 constructed as above will be explained. FIG. 9 is a flow chart showing the operation at the time of registration of evaluation information with position which is performed by the navigation device in accordance with Embodiment 2. Further, FIG. 10 is a flow chart showing the operation at the time of use of evaluation information with position which is performed by the navigation device in accordance with Embodiment 2.

First, the operation at the time of registration will be explained with reference to FIG. 9. Because processes (steps ST21 to ST27) including up to generation of evaluation information with position which is performed by the evaluation information with position generator 8 are the same as those of steps ST1 to ST7 of FIG. 3 in Embodiment 1, the explanation of the processes will be omitted hereafter. Then, in this Embodiment 2, the information transmitter 21 transmits the evaluation information with position generated by the evaluation information with position generator 8 to the predetermined server (server 24 for navigation) (step ST28). As a result, the transmitted evaluation information with position is stored (accumulated) in the evaluation information with position storage 23 in the server 24 for navigation.

Next, the operation at the time of use will be explained with reference to FIG. 10. The information receiver 22 receives evaluation information with position stored in the evaluation information with position storage 23 of the server 24 for navigation (step ST31). Because registration and use of evaluation information with position from a plurality of navigation devices are enabled as mentioned above, items which other users have registered are also included in this evaluation information with position. The map display unit 11 displays a map with evaluation information on the screen, such as the display, on the basis of the map data stored in the map data storage 12 in advance and the evaluation information with position which is received from the evaluation information with position storage 23 of the server 24 for navigation (step ST32).

As mentioned above, because in the navigation device and the server for navigation in accordance with this Embodiment 2, evaluation information with position is stored in the server 24 for navigation, and evaluation information with position which another navigation device stores can also be used, even when the user is driving along a road or in a region for the first time, the user is enabled to know the conditions of the road or region and the conditions of a distant place (a location which is busy now, and so on) in real time if already registered evaluation information with position exists.

Further, although unnecessary data resulting from an accidental utterance or misrecognition may also be stored because this navigation device carries out voice recognition regularly, such unnecessary data are screened with increase in the number of users, and high-reliability information in which errors in the recognition accuracy are absorbed can be provided.

In addition, although a possibility that the timing of a user's utterance shifts from a position where an evaluation is actually made is also considered, the position of each evaluation information which is registered with position is converged to an appropriate position as the number of users increases, and, as a result, high-reliability information in which position errors are also absorbed can be provided.

Although the example in which the user is made to share evaluation information with position with other users by using the server is shown in this Embodiment 2, the user can be alternatively made to share evaluation information with position directly with other users by using an external storage, such as a USB memory or an SD card, by way of a LAN (Local Area Network), or via point-to-point communications using an infrared ray communication, Bluetooth (registered trademark), or the like, or local communications.

Embodiment 3

Figure 11:
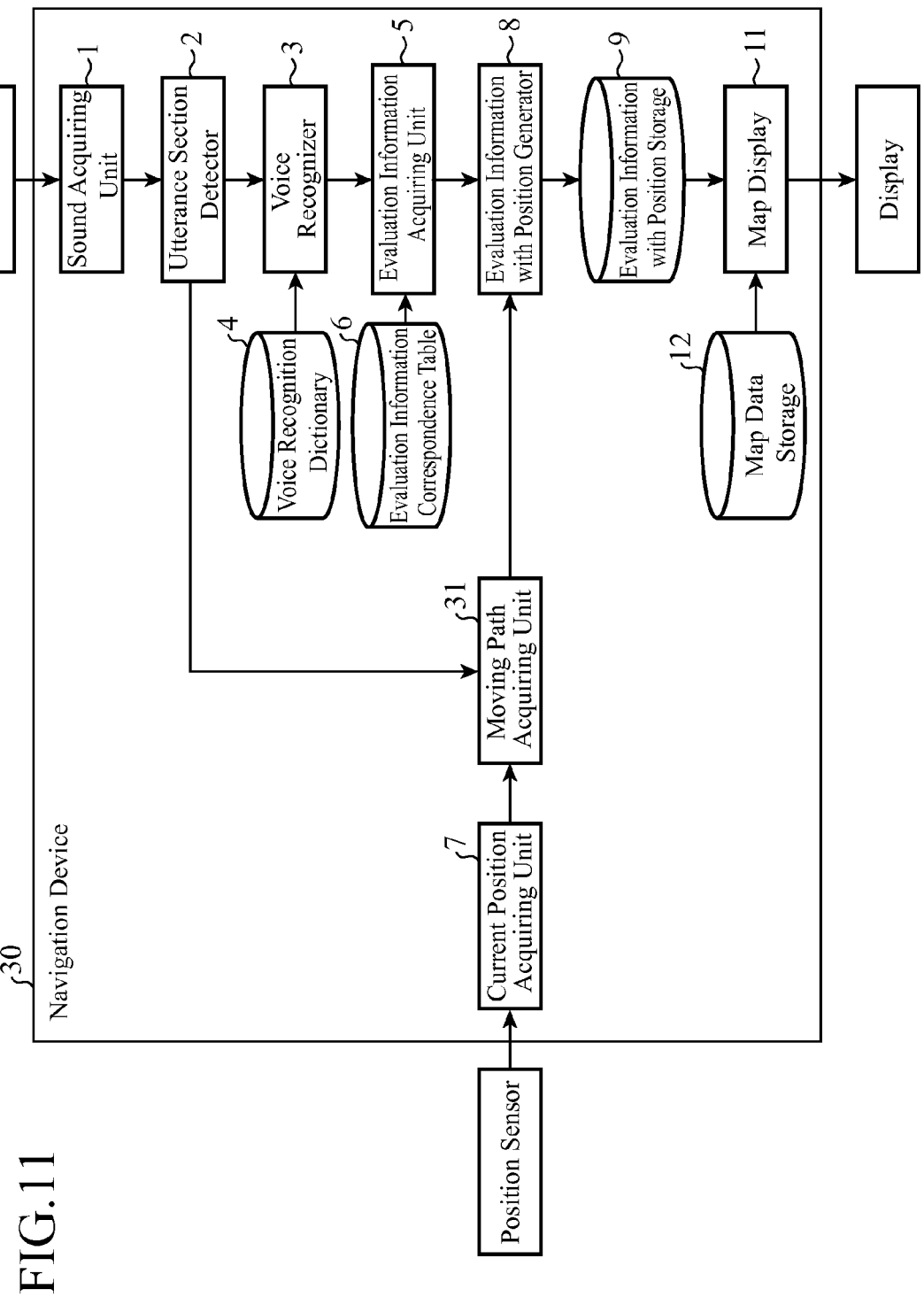
FIG. 11 is a block diagram showing an example of a navigation device in accordance with Embodiment 3.

FIG. 11 is a block diagram showing an example of a navigation device in accordance with Embodiment 3 of the present invention. The same structural components as those explained in Embodiments 1 and 2 are designated by the same reference numerals, and the duplicated explanation of the components will be omitted hereafter. The navigation device 30 in accordance with Embodiment 3 shown hereafter further includes a moving path acquiring unit 31 as compared with the navigation device 10 in accordance with Embodiment 1. The navigation device assigns evaluation information with position to the path of an object in a range which the object has moved during a user's utterance.

The moving path acquiring unit 31 acquires a moving path for an utterance section acquired by an utterance section detector 2 on the basis of current position information acquired by a current position acquiring unit 7. More specifically, the moving path acquiring unit acquires the current position acquired by the current position acquiring unit 7 for the utterance section detected by the utterance section detector 2 as a moving path along which a vehicle (moving object) has moved during a user's utterance. An evaluation information with position generator 8 combines evaluation information acquired by an evaluation information acquiring unit 5 with the moving path acquired by the moving path acquiring unit 31 to generate evaluation information with position. More specifically, the evaluation information with position generator generates evaluation information with position in such a way that the evaluation information with position is registered as evaluation information for all contiguous points (referred to as a "moving range" from here on) of the path along which the vehicle has moved during the utterance.

Figure 12:
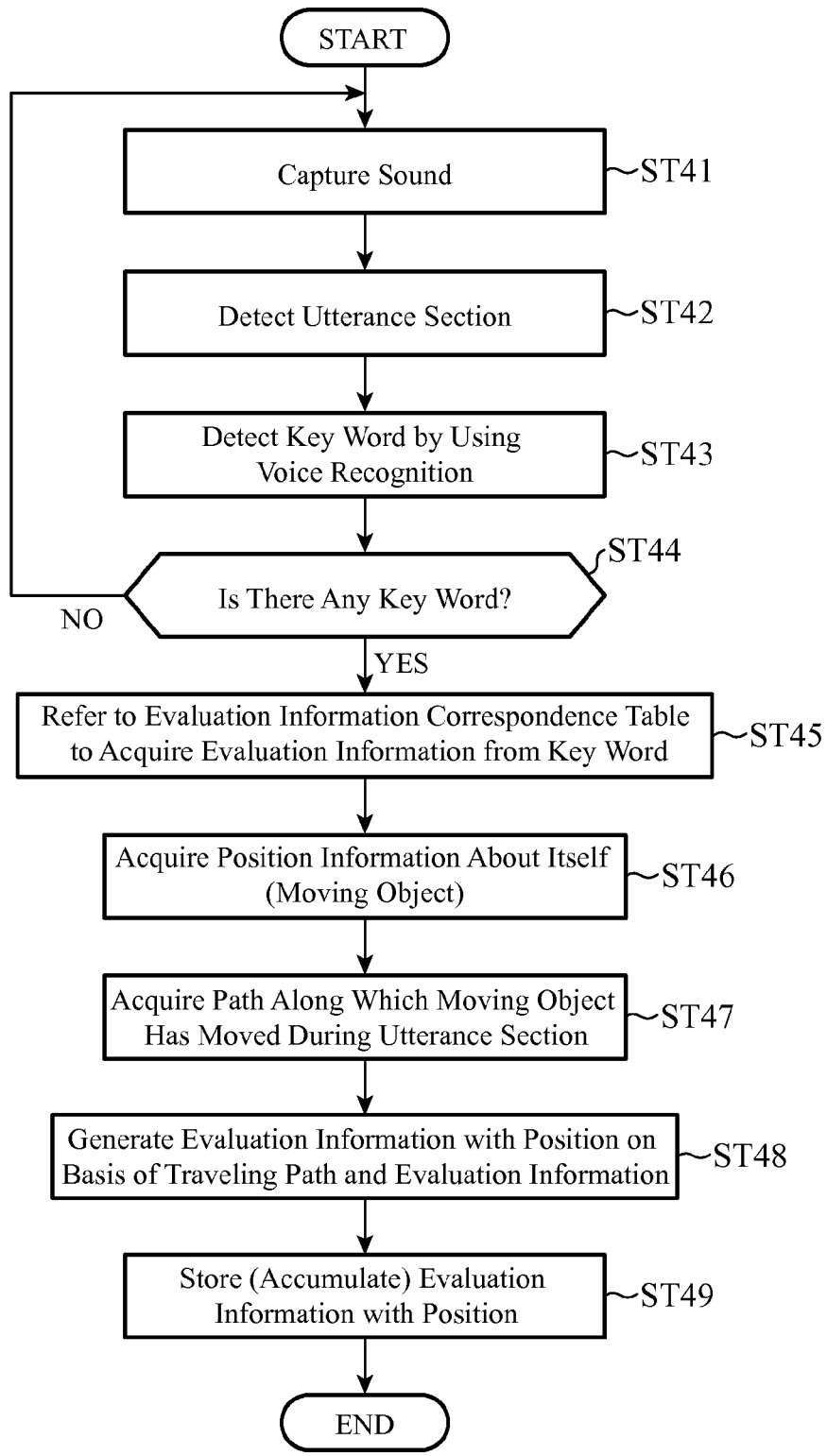
FIG. 12 is a flow chart showing an operation at the time of registration of evaluation information with position which is performed by the navigation device in accordance with Embodiment 3.

Next, the operation of the navigation device in accordance with Embodiment 3 constructed as above will be explained. FIG. 12 is a flow chart showing the operation at the time of registration of evaluation information with position which is performed by the navigation device in accordance with Embodiment 3. Because the operation at the time of use is the same as that shown in FIG. 4 in Embodiment 1, the illustration and the explanation of the operation will be omitted hereafter.

The operation at the time of registration will be explained with reference to FIG. 12. Because processes (steps ST41 to ST46) including up to acquisition of current position information of the vehicle (moving object) which is performed by the current position acquiring unit 7 are the same as those of steps ST1 to ST6 of FIG. 3 in Embodiment 1, the explanation of the processes will be omitted hereafter. Then, in this Embodiment 3, the moving path acquiring unit 31 acquires the moving path on the basis of the current position information of the vehicle (moving object) which is acquired during an utterance section (step ST47). Next, the evaluation information with position generator 8 generates evaluation information with position for the moving range which is acquired during the utterance section by the moving path acquiring unit 31 (step ST48). The navigation device then stores the generated evaluation information with position in an evaluation information with position storage 9 (step ST49). More specifically, the moving range for which the evaluation is made is linked with the evaluation information acquired in step ST45, and is stored together with this evaluation information.

Figure 13:
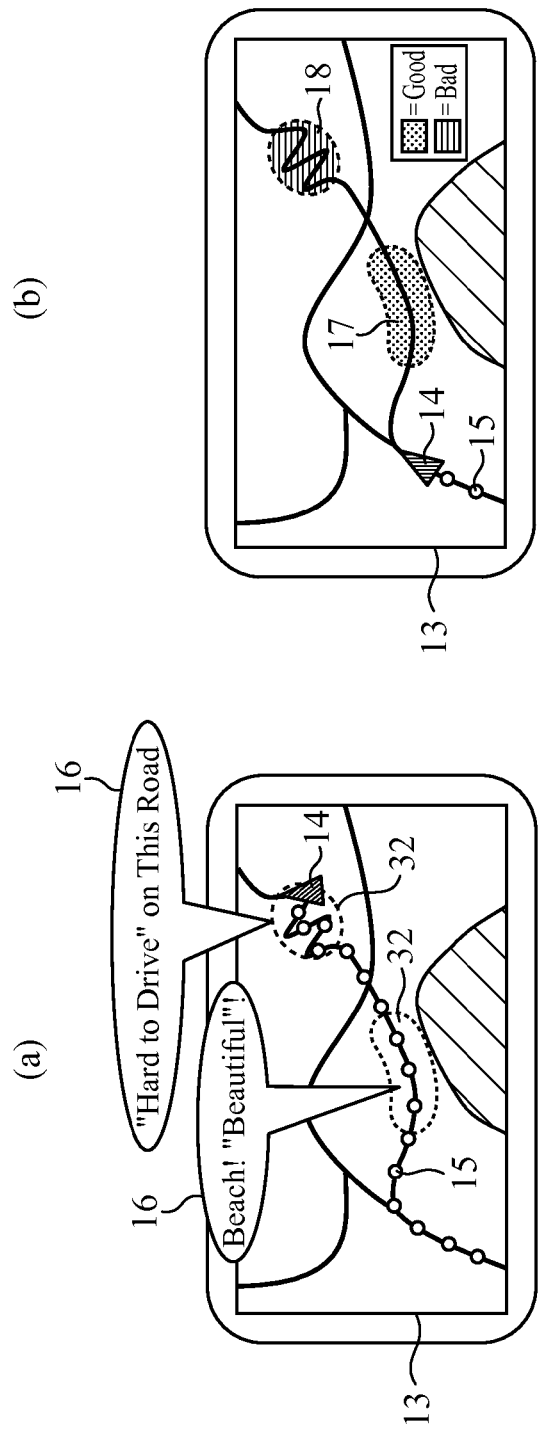
FIG. 13 is an explanatory drawing showing a concrete example of an operation at the time of registration (a) and an operation at the time of use (b) which are performed by the navigation device in accordance with Embodiment 3.

Hereafter, an explanation will be made by providing a concrete example. FIG. 13 is an explanatory drawing showing a concrete example of the operation at the time of registration (a) and the operation at the time of use (b) which are performed by the navigation device in accordance with Embodiment 3. In FIG. 13(a), on a map displayed on a display screen 13 of the navigation device 30, a plurality of path marks 15 showing the traveling path of the vehicle (moving object), and a balloon 16 showing the contents of a user's utterance are illustrated in a state in which a vehicle mark 14 showing the position of the vehicle (moving object) is displayed, like in the case of FIG. 5(a) in Embodiment 1. Although the example in which evaluation information for the contents of a user's utterance is registered with the evaluation information being linked with the point where the utterance was made is shown in Embodiment 1, in this Embodiment 3, evaluation information for the contents of a user's utterance is registered with the evaluation information being linked with a moving path 32 acquired during the utterance section of the utterance (a traveling path which consists of a plurality of path marks 15).

As a result, at the time of use, for example, in a case in which the user passes through the same location again several days later, when a map (FIG. 13(b)) including a moving path where already registered evaluation information with position was registered is displayed on the screen, for example, regions (17, 18) each of which corresponds to the moving path 32 for which the evaluation information with position was registered and has a fixed area, and to each of which a color or the like according to the type of the evaluation information is applied is superimposed and displayed on the map.

As a result, because the evaluation information with position is displayed while an error in the duration of the user's utterance and an error in the timing of the utterance of a key word which is a target for evaluation, and an error between the position of the point which is the target point for evaluation and that of the point where an evaluation (recognition) was actually made are absorbed, the reliability of the evaluation information can be improved and information more useful for the user can be presented to the user.

A weight for each point can be varied according to the size of the moving range. For example, when the vehicle travels a region having an area of ten points, evaluation information with position for each of the points is registered as one-tenth of evaluation information with position. Because evaluation information with position corresponding to one evaluation can be registered for one utterance even in a case in which the utterance is long and even in a case in which the vehicle is travelling at a high speed, fairness can be maintained between each evaluation information with position independently upon the utterance duration and the travelled distance during utterance, and the usability can be improved.

As mentioned above, because the navigation device in accordance with this Embodiment 3 automatically acquires evaluation information for a moving path which is pieces of position information acquired, as a moving path during a user's utterance, by a position sensor from both a recognition result acquired by recognizing the user's utterance regularly, and the moving path, and registers the evaluation information, the navigation device can leave an impression (evaluation) of the above-mentioned moving path (a region having a range) without requiring the user's special operation. As a result, a positional error other than an impression (evaluation) for a pinpointed point can also be absorbed. Further, at the time of use, the navigation device enables the user to revisit a region through which the user desires to pass once again, bypass a region through which the user desires to never pass again, and so on without requiring the user's work of consciously memorizing the impression of each moving path and so on, thereby being able to support the user's comfortable movement.

Embodiment 4

Figure 14:
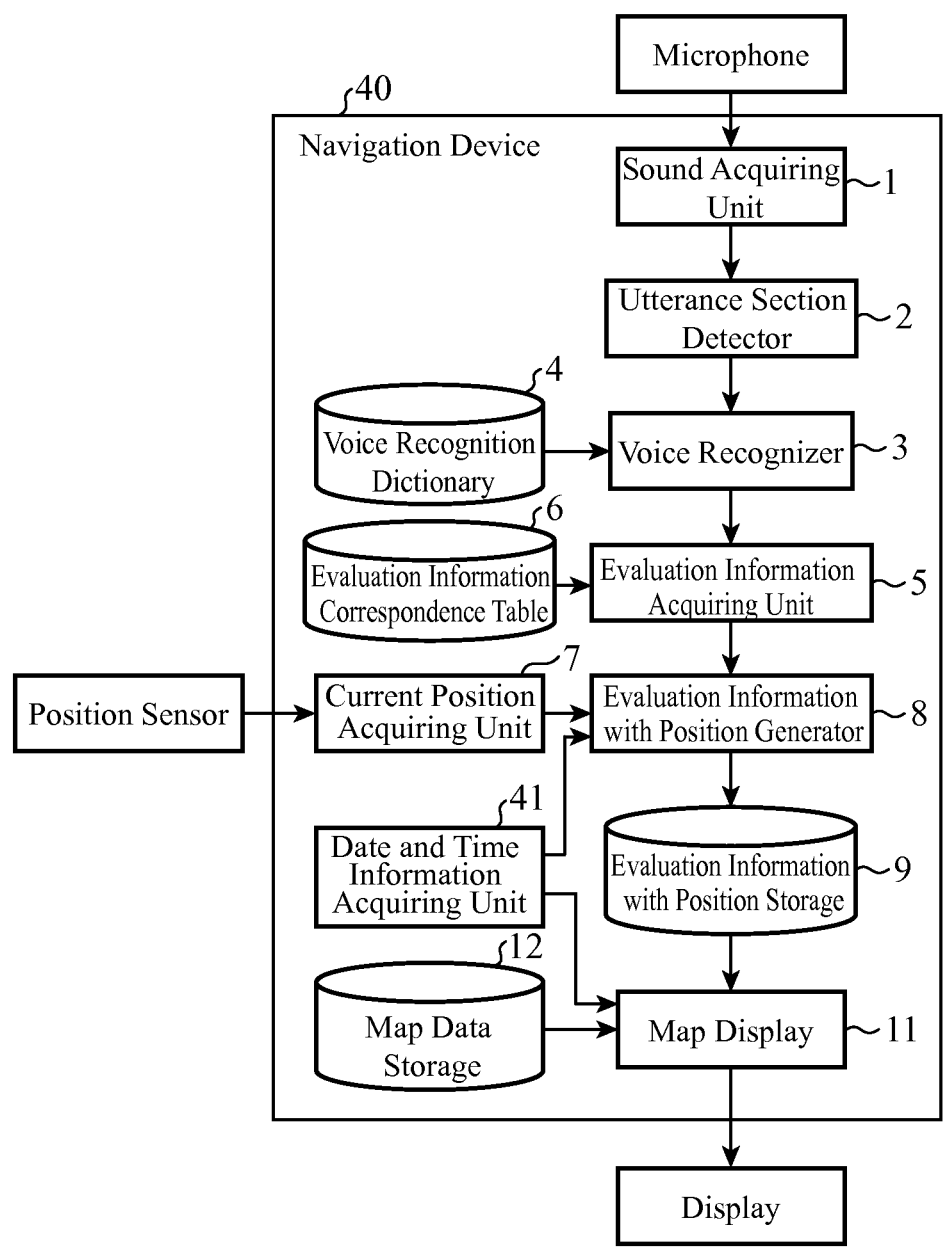
FIG. 14 is a block diagram showing an example of a navigation device in accordance with Embodiment 4.

FIG. 14 is a block diagram showing an example of a navigation device in accordance with Embodiment 4 of the present invention. The same structural components as those explained in Embodiments 1 to 3 are designated by the same reference numerals, and the duplicated explanation of the components will be omitted hereafter. The navigation device 40 in accordance with Embodiment 4 shown hereafter further includes a date and time information acquiring unit 41 as compared with the navigation device 10 in accordance with Embodiment 1. The navigation device then adds date and time information to evaluation information with position and stores this evaluation information with position, and presents evaluation information with position suitable for the date and time of use to a user.

The date and time information acquiring unit 41 acquires current date and time information (information including a time, a date, a month, a year, etc.) from a clock or the like in the navigation device 10.

An evaluation information with position generator 8 then adds the current date and time information acquired by the date and time information acquiring unit 41 to generate evaluation information with position.

Further, a map display unit 11 displays map data to which only evaluation information with position in which the current date and time acquired by the date and time information acquiring unit 41 matches the date and time information added to the evaluation information with position is added on a display.

Figure 15:
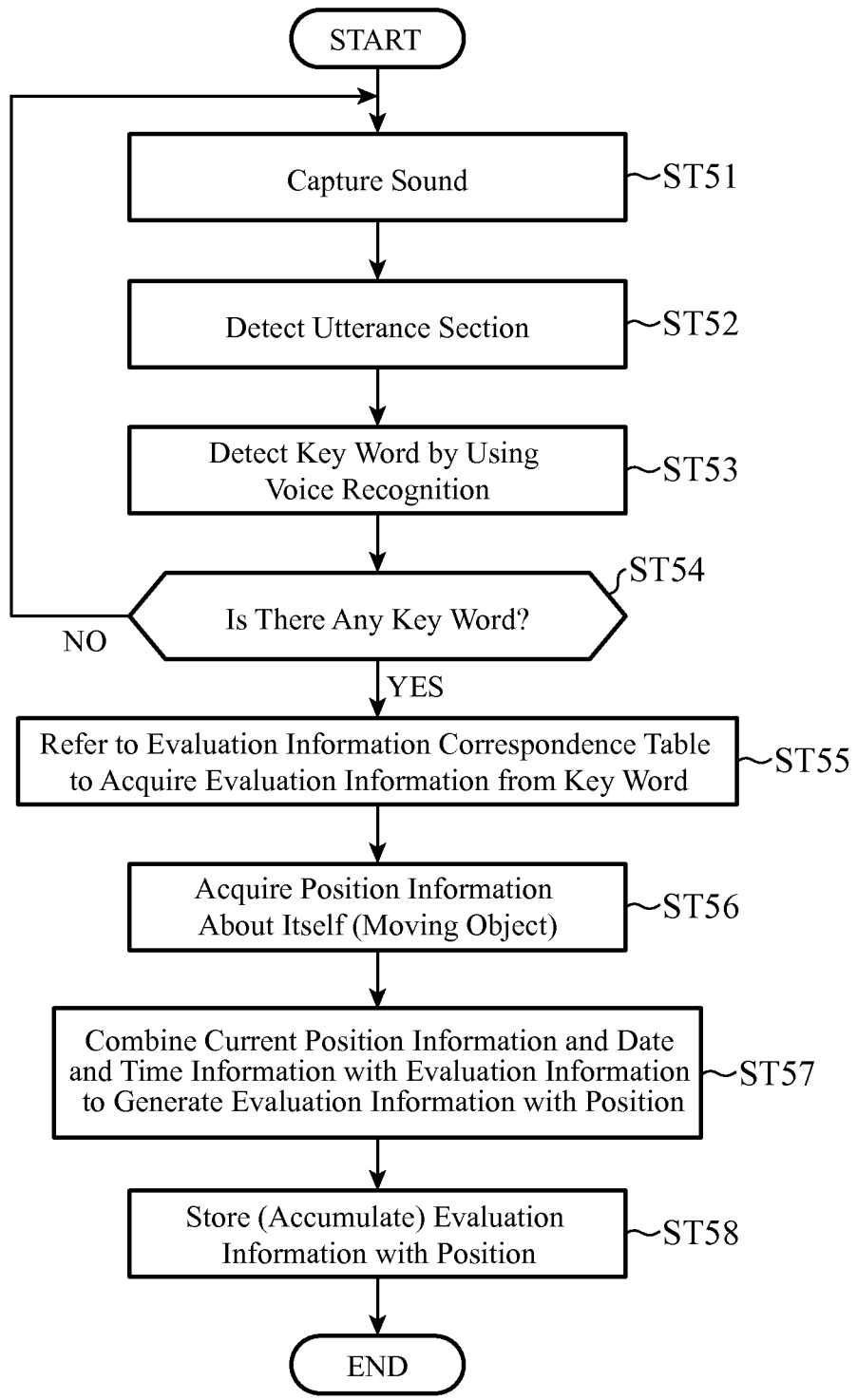
FIG. 15 is a flow chart showing an operation at the time of registration of evaluation information with position which is performed by the navigation device in accordance with Embodiment 4.
Figure 16:
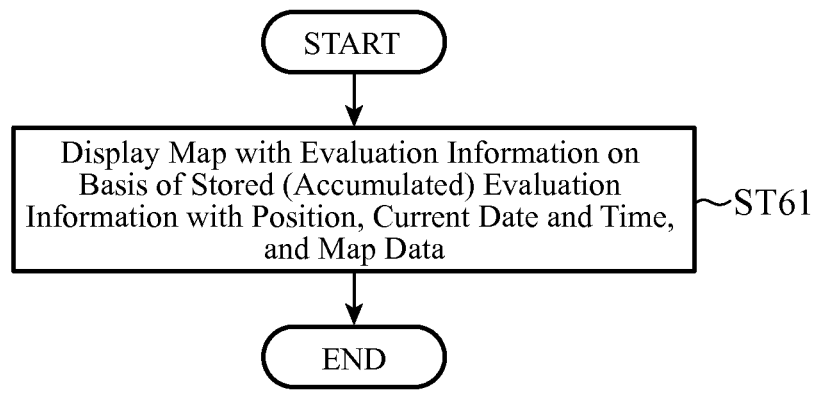
FIG. 16 is a flow chart showing an operation at the time of use of evaluation information with position which is performed by the navigation device in accordance with Embodiment 4.

Next, the operation of the navigation device in accordance with Embodiment 4 constructed as above will explained. FIG. 15 is a flow chart showing the operation at the time of registration of evaluation information with position which is performed by the navigation device in accordance with Embodiment 4. Further, FIG. 16 is a flow chart showing the operation at the time of use of evaluation information with position which is performed by the navigation device in accordance with Embodiment 4.

First, the operation at the time of registration will be explained with reference to FIG. 15. Because processes (steps ST51 to ST56) including up to acquisition of current position information of a vehicle (moving object) which is performed by a current position acquiring unit 7 are the same as those of steps ST1 to ST6 of FIG. 3 in Embodiment 1, the explanation of the processes will be omitted hereafter. Then, in this Embodiment 4, the date and time information acquiring unit 41 acquires current date information, and, when generating evaluation information with position on the basis of the current position information and evaluation information, the evaluation information with position generator 8 adds the current date information to generate evaluation information with position (step ST57). The navigation device then stores the generated evaluation information with position in an evaluation information with position storage 9 (step ST58).

Next, the operation at the time of use will be explained with reference to FIG. 16. The map display unit 11 displays a map to which only evaluation information with position matching at least one of the current time, a time zone, the date, the month, the year, and a time period is added on the screen, such as the display, on the basis of the evaluation information with position which is stored in the evaluation information with position storage 9 and to which the date and time information is added, and map data stored in a map data storage 12 (step ST61).

As mentioned above, the navigation device in accordance with this Embodiment 4 can provide only appropriate information about evaluation information depending on a season, a time zone or the like, such as evaluation information for a location where the night view is beautiful, and a location where the road is frozen in the mornings and evenings in winter, at an appropriate timing.

Embodiment 5

Figure 17:
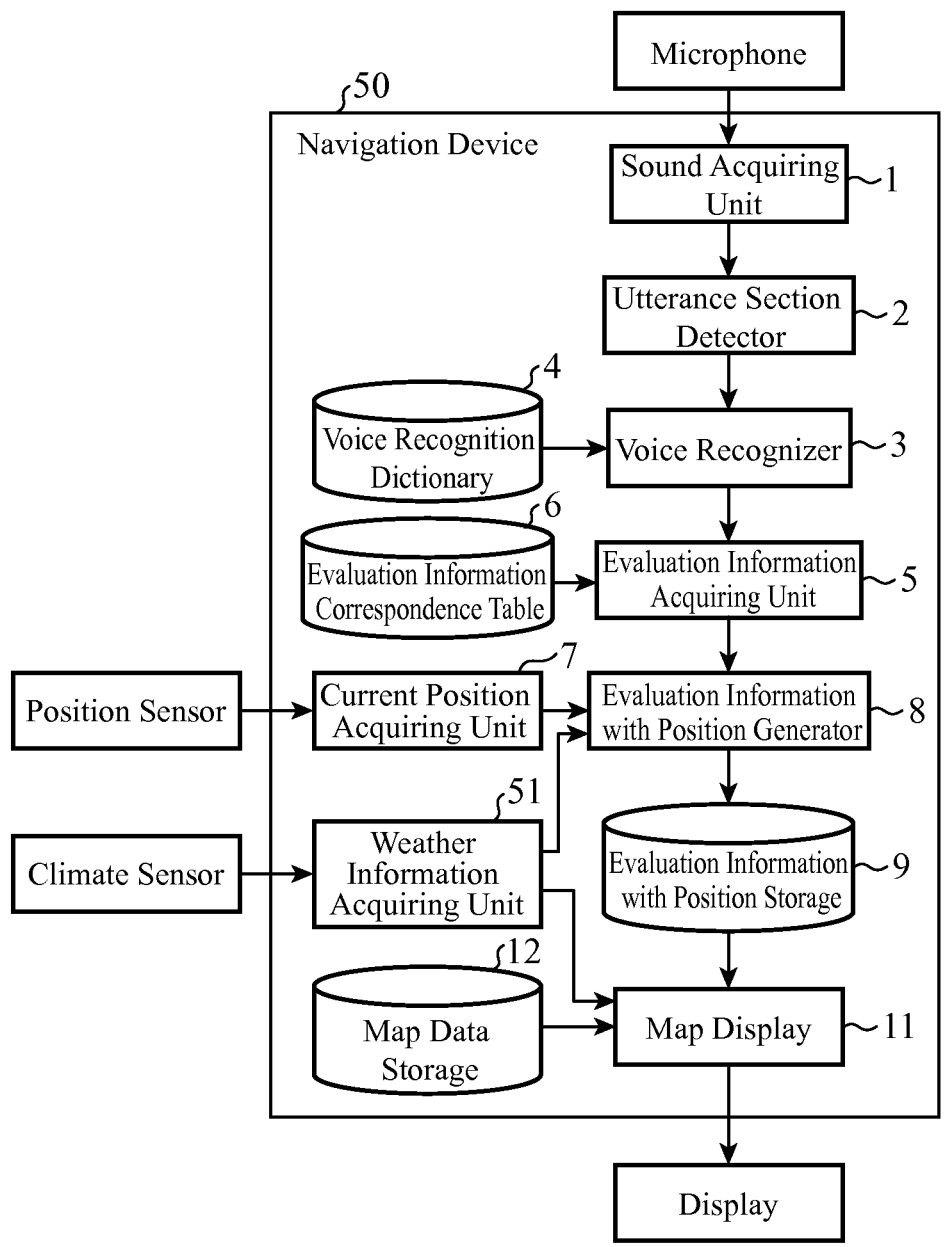
FIG. 17 is a block diagram showing an example of a navigation device in accordance with Embodiment 5.

FIG. 17 is a block diagram showing an example of a navigation device in accordance with Embodiment 5 of the present invention. The same structural components as those explained in Embodiments 1 to 4 are designated by the same reference numerals, and the duplicated explanation of the components will be omitted hereafter. The navigation device 50 in accordance with Embodiment 5 shown hereafter further includes a weather information acquiring unit 51 as compared with the navigation device 10 in accordance with Embodiment 1. The navigation device adds weather information to evaluation information with position and stores this evaluation information with position, and presents evaluation information with position suitable for the weather at the time of use to a user.

The weather information acquiring unit 51 acquires at least one of the weather, the illumination, the temperature, and the humidity as current weather information by using a weather sensor. As the weather sensor, a rain sensor, an illuminance sensor, a thermometer, a hygrometer, or the like which is mounted in a typical vehicle can be used.

An evaluation information with position generator 8 then adds the current weather information acquired by the weather information acquiring unit 51 to generate evaluation information with position.

Further, a map display unit 11 displays map data to which only evaluation information with position in which the current weather acquired by the weather information acquiring unit 51 matches the weather information added to the evaluation information with position is added on a display.

Figure 18:
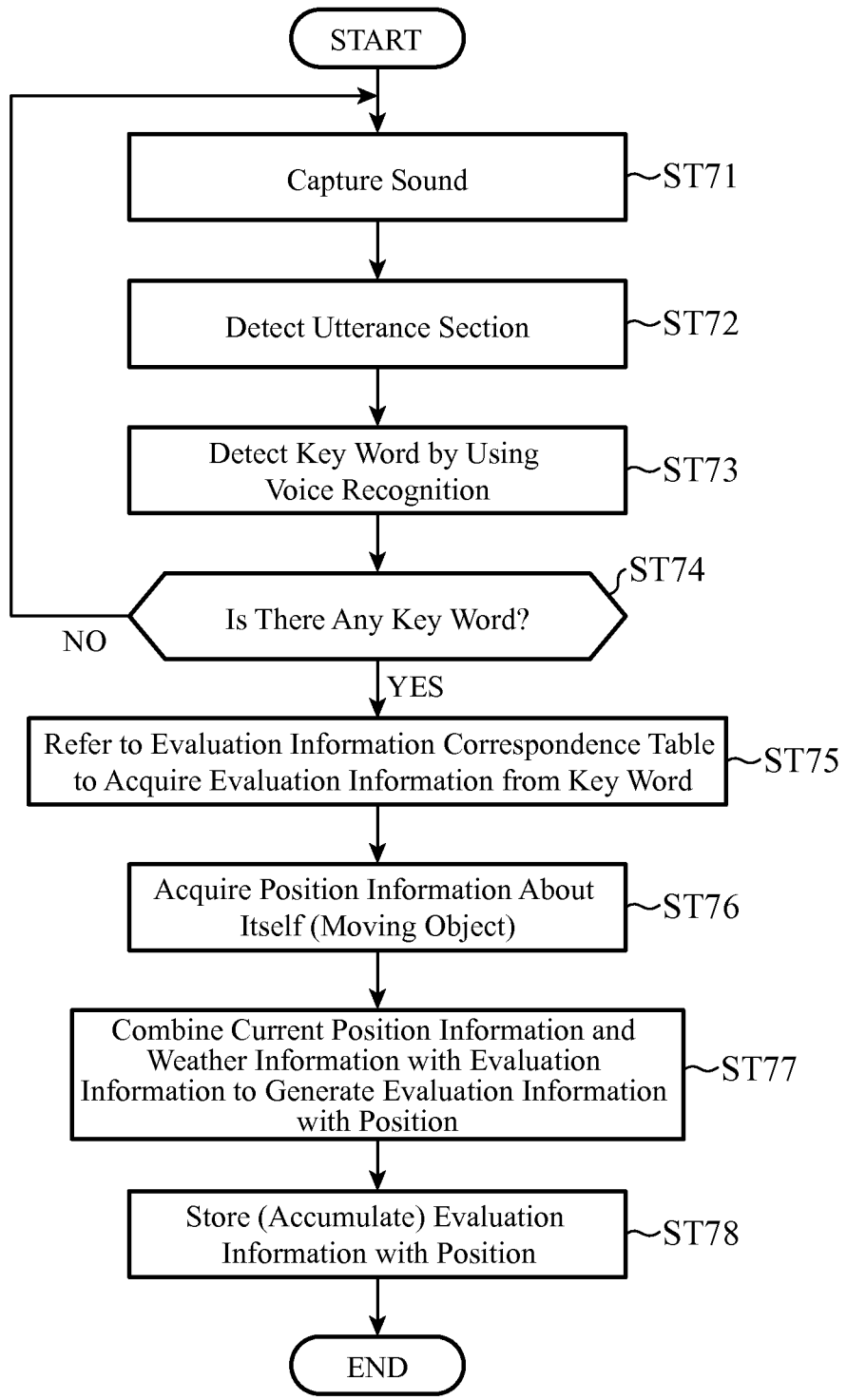
FIG. 18 is a flow chart showing an operation at the time of registration of evaluation information with position which is performed by the navigation device in accordance with Embodiment 5.
Figure 19:
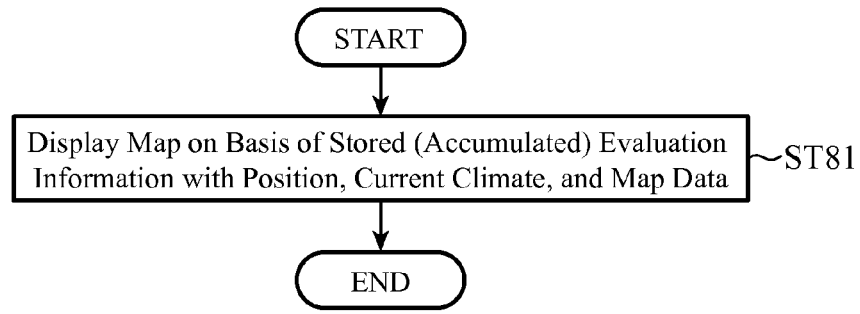
FIG. 19 is a flow chart showing an operation at the time of use of evaluation information with position which is performed by the navigation device in accordance with Embodiment 5.

Next, the operation of the navigation device in accordance with Embodiment 5 constructed as above will explained. FIG. 18 is a flow chart showing the operation at the time of registration of evaluation information with position which is performed by the navigation device in accordance with Embodiment 5. Further, FIG. 19 is a flow chart showing the operation at the time of use of evaluation information with position which is performed by the navigation device in accordance with Embodiment 5.

First, the operation at the time of registration will be explained with reference to FIG. 18. Because processes (steps ST71 to ST76) including up to acquisition of current position information of a vehicle (moving object) which is performed by a current position acquiring unit 7 are the same as those of steps ST1 to ST6 of FIG. 3 in Embodiment 1, the explanation of the processes will be omitted hereafter. Then, in this Embodiment 5, when the weather information acquiring unit 51 acquires the current weather information and, when generating evaluation information with position on the basis of the current position information and evaluation information, the evaluation information with position generator 8 adds the current weather information to generate evaluation information with position (step ST77). The navigation device then stores the generated evaluation information with position in an evaluation information with position storage 9 (step ST78).

Next, the operation at the time of use will be explained with reference to FIG. 19. The map display unit 11 displays a map to which only evaluation information with position matching at least one of the current weather, the illumination, the temperature, and the humidity is added on the screen, such as the display, on the basis of both the evaluation information with position which is stored in the evaluation information with position storage 9 and to which the weather information is added and map data stored in a map data storage 12 (step ST81).

As mentioned above, the navigation device in accordance with this Embodiment 5 can provide only appropriate information about evaluation information depending on a weather condition, such as weather or air temperature, at an appropriate timing.

Embodiment 6

Figure 20:
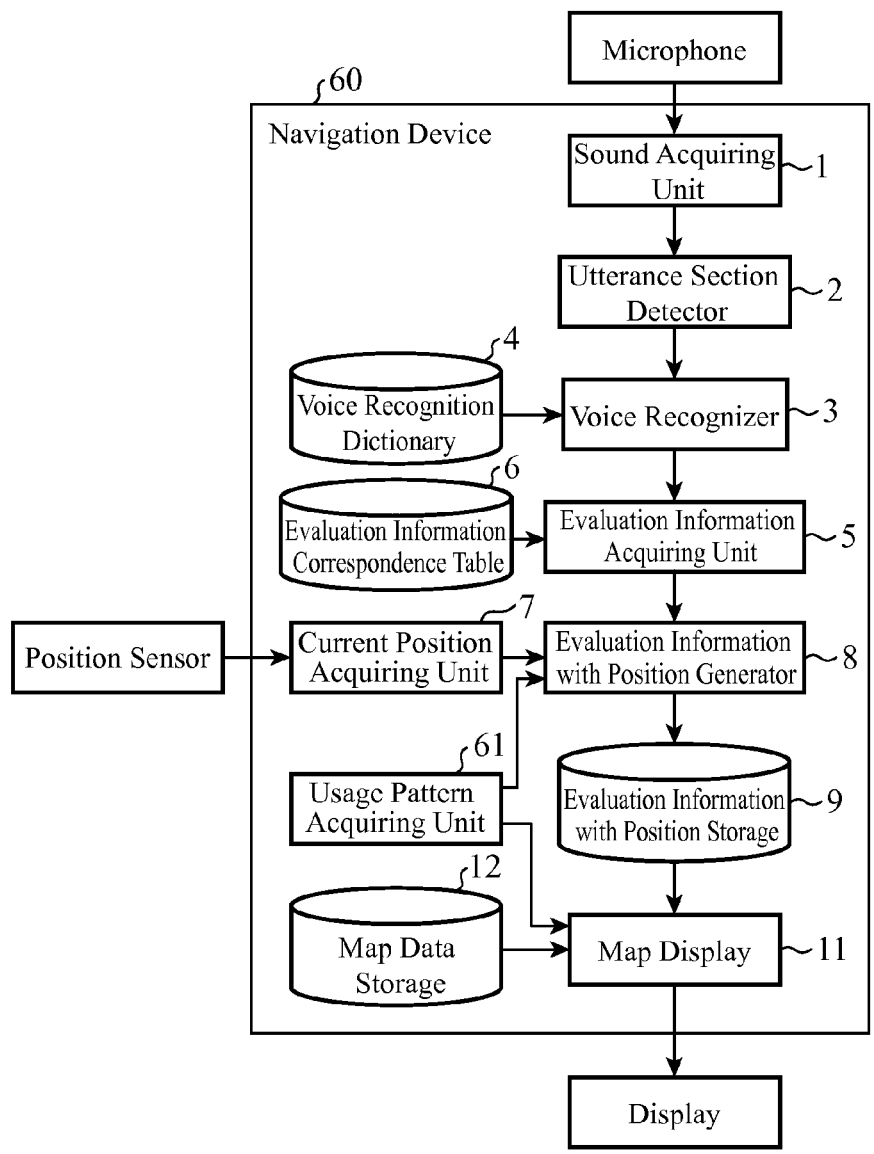
FIG. 20 is a block diagram showing an example of a navigation device in accordance with Embodiment 6.

FIG. 20 is a block diagram showing an example of a navigation device in accordance with Embodiment 6 of the present invention. The same structural components as those explained in Embodiments 1 to 5 are designated by the same reference numerals, and the duplicated explanation of the components will be omitted hereafter. The navigation device 60 in accordance with Embodiment 6 shown hereafter further includes a usage pattern acquiring unit 61 as compared with the navigation device 10 in accordance with Embodiment 1. The navigation device then adds usage pattern information to evaluation information with position and stores this evaluation information with position, and presents evaluation information with position suitable for a usage pattern to a user.

The usage pattern acquiring unit 61 acquires a usage pattern of itself (moving object). For example, the usage pattern acquiring unit determines whether or not the current usage pattern of the moving object is vehicle (car) according to whether a vehicle speed signal is inputted to acquire the usage pattern.

In this Embodiment 6, an explanation will be made by assuming that the following two types: "car" and "walk" exist as the type of the usage pattern. When the usage pattern is "car", the usage pattern shows that this navigation device 60 is in a state in which the navigation device is used while it is mounted in (or carried onto) a car. When the usage pattern is "walk", the usage pattern shows that the navigation device is in a state in which a person walking uses the navigation device while carrying it in hand. In this case, for example, there can be considered an example in which when a vehicle speed signal is inputted, the usage pattern type is set to "car" while when no vehicle speed signal is inputted, the usage pattern type is set to "walk." Further, the user can be allowed to set a usage pattern by performing a key operation, a touch panel operation, or the like at the time of starting to use the navigation device.

Although the example in which the following two types: "car" and "walk" are provided as the usage pattern types is explained in this Embodiment 6, "two-wheeled vehicle", "electric car", "airplane", etc. can be provided additionally as usage pattern types, and any usage pattern type can be added as long as it indicates a pattern at the time of use (at the time of movement).

An evaluation information with position generator 8 then adds the usage pattern of the moving object acquired by the usage pattern acquiring unit 61 to generate evaluation information with position.

Further, a map display unit 11 displays map data to which only evaluation information with position in which the usage pattern of the moving object acquired by the usage pattern acquiring unit 61 matches the usage pattern added to the evaluation information with position is added on a display.

Figure 21:
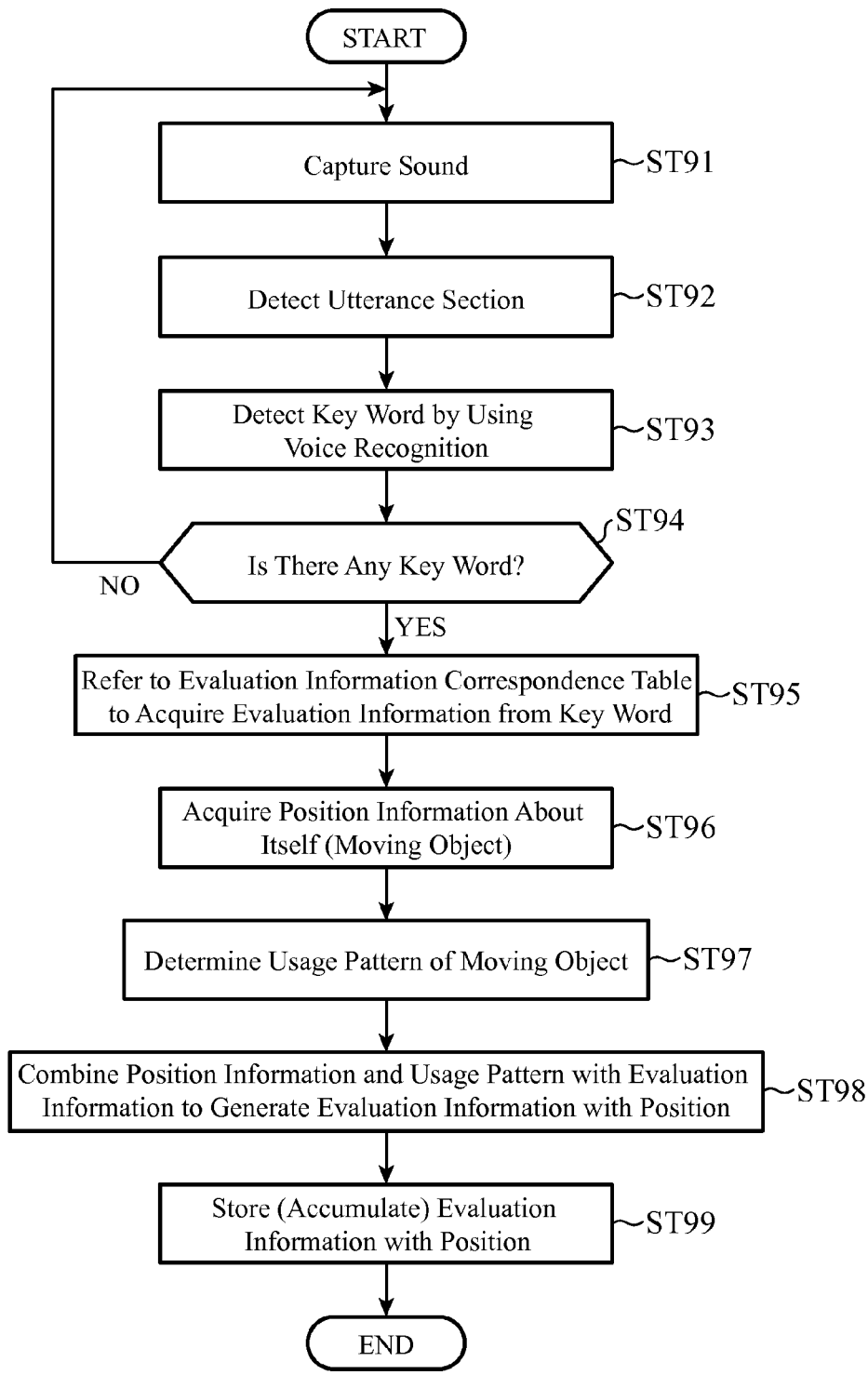
FIG. 21 is a flow chart showing an operation at the time of registration of evaluation information with position which is performed by the navigation device in accordance with Embodiment 6.
Figure 22:
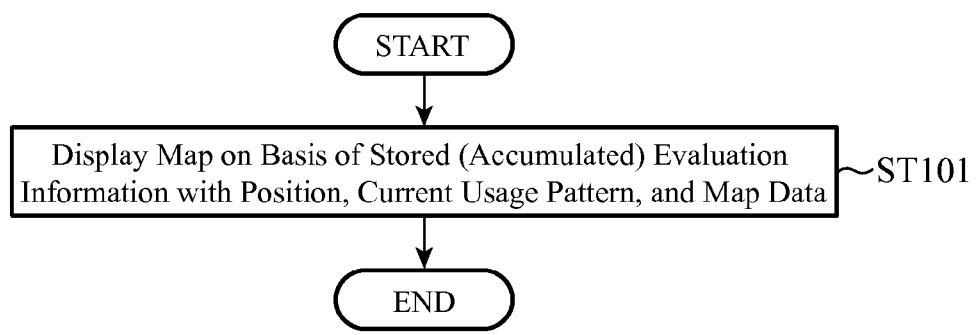
FIG. 22 is a flow chart showing an operation at the time of use of evaluation information with position which is performed by the navigation device in accordance with Embodiment 6.

Next, the operation of the navigation device in accordance with Embodiment 6 constructed as above will explained. FIG. 21 is a flow chart showing the operation at the time of registration of evaluation information with position which is performed by the navigation device in accordance with Embodiment 6. Further, FIG. 22 is a flow chart showing the operation at the time of use of evaluation information with position which is performed by the navigation device in accordance with Embodiment 6.

First, the operation at the time of registration will be explained with reference to FIG. 21. Because processes (steps ST91 to ST96) including up to acquisition of current position information of itself (moving object) which is performed by a current position acquiring unit 7 are the same as those of steps ST1 to ST6 of FIG. 3 in Embodiment 1, the explanation of the processes will be omitted hereafter. Then, in this Embodiment 6, the usage pattern acquiring unit 61 determines the current usage pattern of the moving object from the presence or absence of input of a vehicle speed signal, or the like to acquire the current usage pattern (step ST97). Next, when generating evaluation information with position on the basis of the current position information and evaluation information, the evaluation information with position generator 8 adds the type of the current usage pattern to generate evaluation information with position (step ST98). The navigation device then stores the generated evaluation information with position in an evaluation information with position storage 9 (step ST99).

Next, the operation at the time of use will be explained with reference to FIG. 22. The map display unit 11 displays a map with evaluation information which is limited to only evaluation information with position matching the current usage pattern on the screen, such as the display, on the basis of both evaluation information with position which is stored in the evaluation information with position storage 9 and to which a usage pattern type is added and map data stored in a map data storage 12 (step ST101).

As mentioned above, the navigation device in accordance with this Embodiment 6 can provide information depending on a usage pattern, such as information showing that, for example, there is no problem with the user's travelling by walk, but, when travelling by car, the road width is narrow and hence it is hard to drive, for the user while discriminating the information depending on the usage pattern from other information.

Embodiment 7

Figure 23:
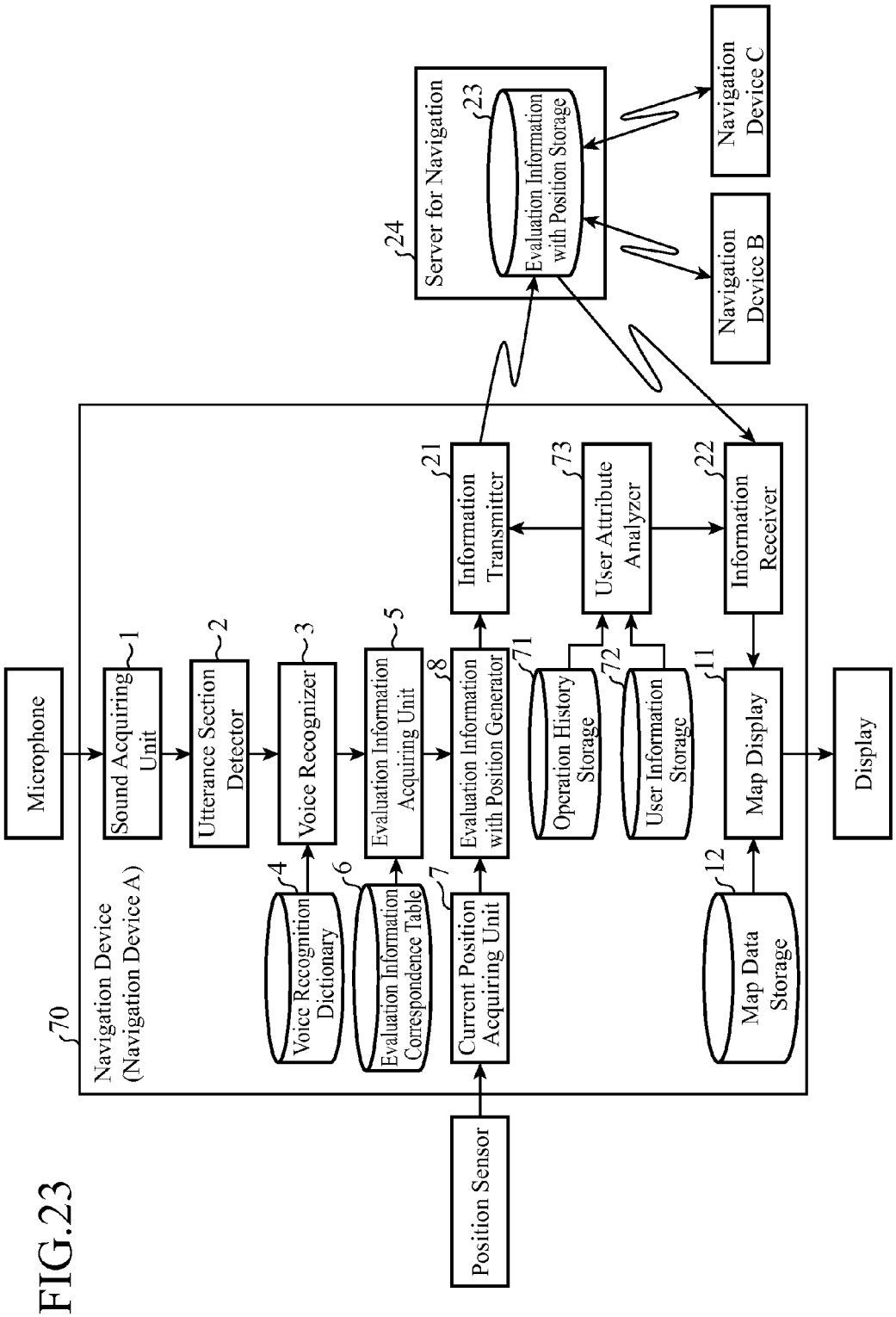
FIG. 23 is a block diagram showing an example of a navigation device in accordance with Embodiment 7.

FIG. 23 is a block diagram showing an example of a navigation device in accordance with Embodiment 7 of the present invention. The same structural components as those explained in Embodiments 1 to 6 are designated by the same reference numerals, and the duplicated explanation of the components will be omitted hereafter. The navigation device 70 in accordance with Embodiment 7 shown hereafter further includes an operation history storage 71, a user information storage 72, and a user attribute analyzer 73 as compared with the navigation device 20 in accordance with Embodiment 2.

An information transmitter 21 then provides a user attribute for evaluation information with position, and transmits this evaluation information with position to a server 24 for navigation. Further, an information receiver 22 receives evaluation information with position from the server 24 for navigation by limiting this evaluation information with position to evaluation information with position whose user attribute matches or is similar to that thereof, and presents evaluation information with position suitable for a user to the user.

The operation history storage 71 stores an operation history, such as a history of key inputs made by a user from a key input unit. For example, the operation history storage stores operation histories, such as a history of destination settings made by a user and a history of operations on information regarding a frequently-used function, and so on.

The user information storage 72 stores user information preset by a user. For example, the user information storage stores a user's gender, age, interest, etc. In this embodiment, it is assumed that the user information storage stores user information including at least a user's gender and age.

The user attribute analyzer 73 analyzes a user attribute on the basis of both the user operation histories stored in the operation history storage 71 and the user information stored in the user information storage 72. For example, a user attribute like "eating out lover" can be added to a user who eats out frequently on the basis of the destination setting history, and plural pieces of information can be combined and handled as vector data by, for example, counting the number of times of destination setting according to genre.

An evaluation information with position generator 8 then adds the user attribute analyzed by the user attribute analyzer 73 to generate evaluation information with position.

Further, the information transmitter 21 transmits the evaluation information with position to which the user attribute is added to the server 24 for navigation on a network, and the information receiver 22 receives evaluation information with position in which the user attribute analyzed by the user attribute analyzer 73 matches the user attribute added to the evaluation information with position from the server 24 for navigation on the network.

Figure 24:
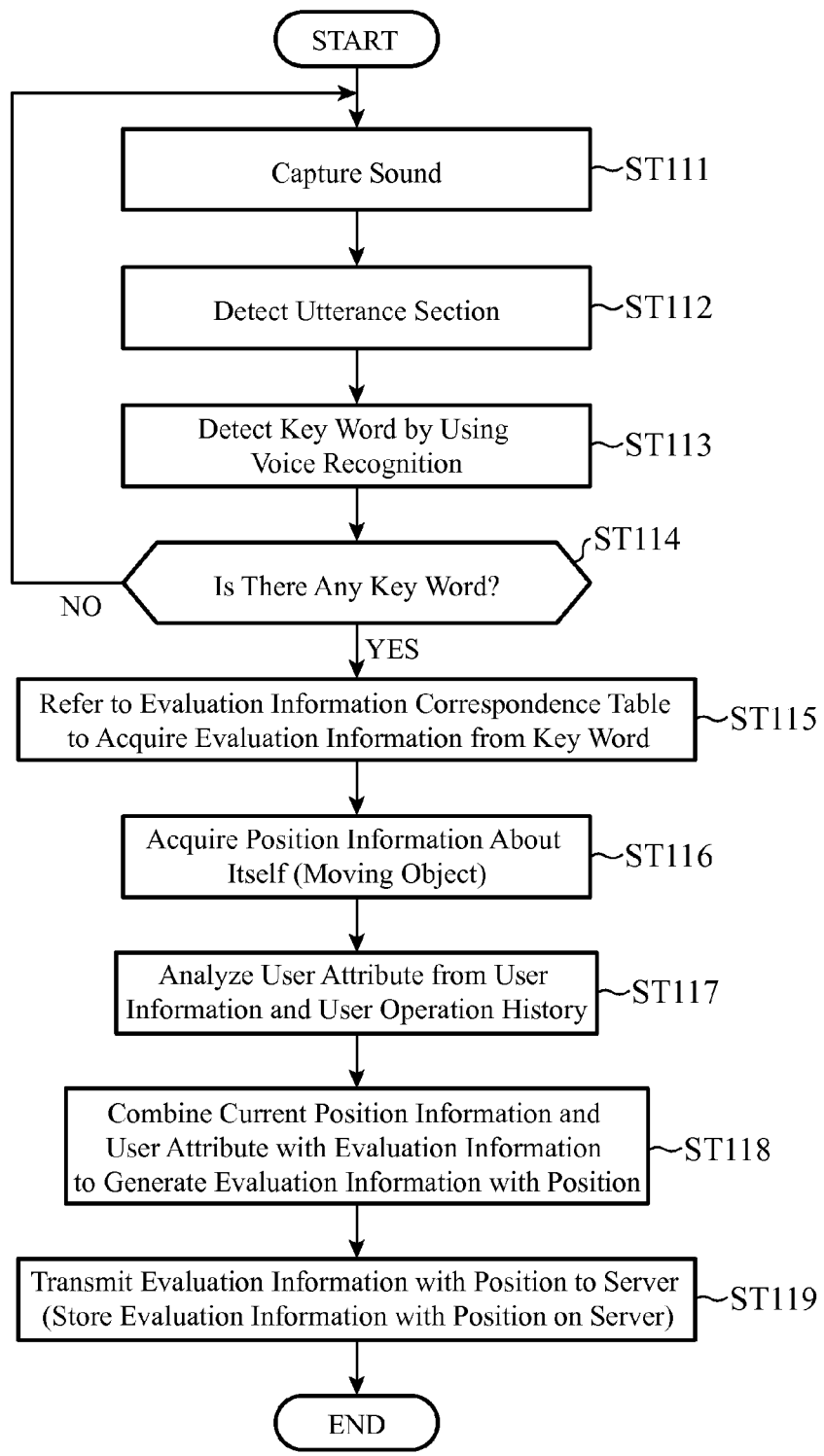
FIG. 24 is a flow chart showing an operation at the time of registration of evaluation information with position which is performed by the navigation device in accordance with Embodiment 7.
Figure 25:
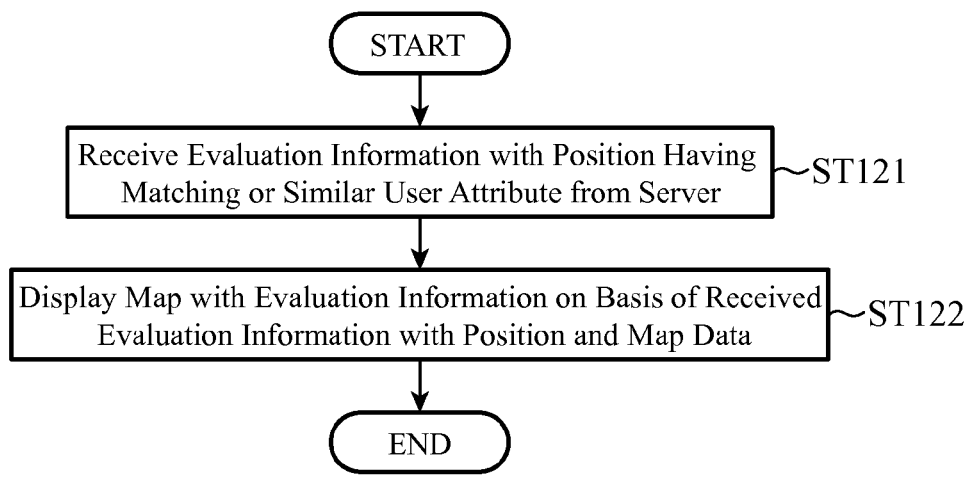
FIG. 25 is a flow chart showing an operation at the time of use of evaluation information with position which is performed by the navigation device in accordance with Embodiment 7.

Next, the operation of the navigation device in accordance with Embodiment 7 constructed as above will explained. FIG. 24 is a flow chart showing the operation at the time of registration of evaluation information with position which is performed by the navigation device in accordance with Embodiment 7. Further, FIG. 25 is a flow chart showing the operation at the time of use of evaluation information with position which is performed by the navigation device in accordance with Embodiment 7.

First, the operation at the time of registration will be explained with reference to FIG. 24. Because processes (steps ST111 to ST116) including up to acquisition of current position information of a vehicle (moving object) which is performed by a current position acquiring unit 7 are the same as those of steps ST1 to ST6 of FIG. 3 in Embodiment 1, the explanation of the processes will be omitted hereafter. Then, in this Embodiment 7, the user attribute analyzer 73 analyzes a user attribute on the basis of the user information stored in the user information storage 72 and the operation histories stored in the operation history storage 71 (step ST117).

Next, the evaluation information with position generator 8 provides the user attribute analyzed by the user attribute analyzer 73 to generate evaluation information with position (step ST118). Then, the information transmitter 21 transmits the evaluation information with position for which the user attribute generated by the evaluation information with position generator 8 is provided to the predetermined server (server 24 for navigation) (step ST119). As a result, the transmitted evaluation information with position is stored (accumulated) in an evaluation information with position storage 23 in the server 24 for navigation.

Next, the operation at the time of use will be explained with reference to FIG. 25. On the basis of the user attribute of the user which is analyzed by the user attribute analyzer, the information receiver 22 receives the evaluation information with position whose user attribute matches or is similar to the above-mentioned user attribute (step ST121). Also in this Embodiment 7, because registration and use of evaluation information with position from a plurality of navigation devices are enabled, like in the case of Embodiment 2, items which other users have registered are also included in this evaluation information with position. A map display unit 11 then displays a map with evaluation information according to the user attribute on the screen, such as a display, on the basis of map data stored in a map data storage 12 in advance and the evaluation information with position which is received from the evaluation information with position storage 23 of the server 24 for navigation (step ST122).

As mentioned above, the navigation device and the server for navigation in accordance with this Embodiment 7 can provide information which meets each user's taste and attribute. As a result, a problem of displaying information also including unnecessary information and hence making the information difficult to understand can be prevented, and only information which is likely to be more helpful for the user can be displayed selectively.

Embodiment 8

Figure 26:
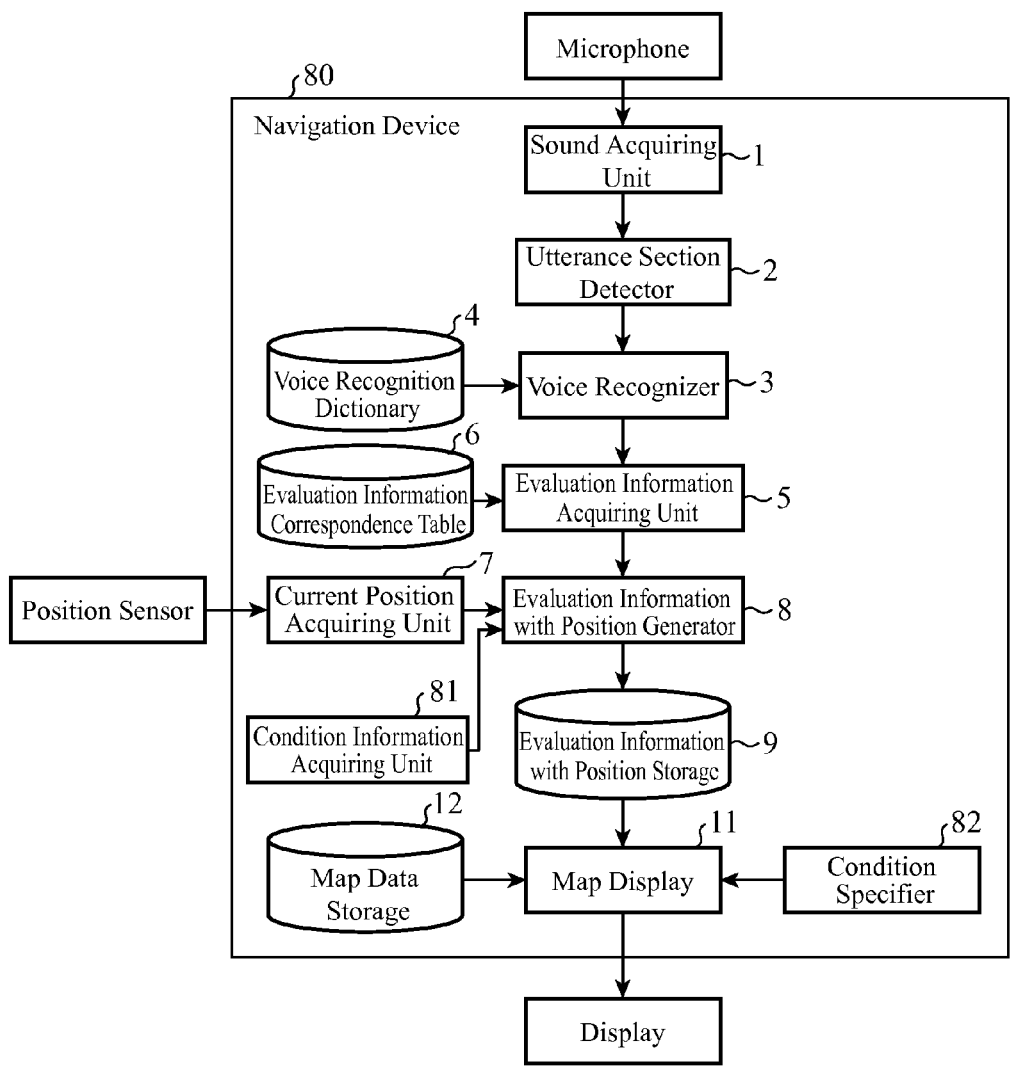
FIG. 26 is a block diagram showing an example of a navigation device in accordance with Embodiment 8.

FIG. 26 is a block diagram showing an example of a navigation device in accordance with Embodiment 8 of the present invention. The same structural components as those explained in Embodiments 1 to 7 are designated by the same reference numerals, and the duplicated explanation of the components will be omitted hereafter. The navigation device 80 in accordance with Embodiment 8 shown hereafter further includes a condition information acquiring unit 81 that acquires or determines various pieces of information, the condition information acquiring unit corresponding to a date and time information acquiring unit 41, a weather information acquiring unit 51, a usage pattern acquiring unit 61, a user attribute analyzer 73, and so on, which are the same as those of the navigation devices 40 to 70 in accordance with Embodiments 4 to 7, and a condition specifier 82.

The condition information acquiring unit 81 is provided with at least one of a date and time information acquiring unit 41, a weather information acquiring unit 51, a usage pattern acquiring unit 61, and a user attribute analyzers 73, which are the same as those explained in Embodiments 4 to 7. More specifically, the condition information acquiring unit 81 acquires at least one of current date and time information, weather information, a usage pattern of a moving object, and a user attribute.

The condition specifier 82 enables a user to specify a type of evaluation information, a recognition key word, a time, a time zone, a date, a month, a year, a period, a weather, a usage pattern type, a user attribute, the number of pieces of evaluation information, or the like by performing an operation from a key input unit or the like at the time of use of evaluation information with position. In this embodiment, an explanation will be made by assuming that at least one condition of the current date and time information, the weather information, the usage pattern of the moving object, a user attribute, and a type of evaluation information ("good" or "bad") is specified.

An evaluation information with position generator 8 adds the condition acquired by the condition information acquiring unit 81 (at least one of the date and time information, the weather information, the usage pattern, and the user attribute) to generate evaluation information with position.

Further, a map display unit 11 displays a map on a display screen, such as a display, by limiting the evaluation information with position to evaluation information with position corresponding to the condition specified by the condition specifier 82. More specifically, the map display unit displays map data to which only evaluation information with position in which the condition specified by the condition specifier 82 matches the condition added to the above-mentioned evaluation information with position is added on the display screen such as a display.

Figure 27:
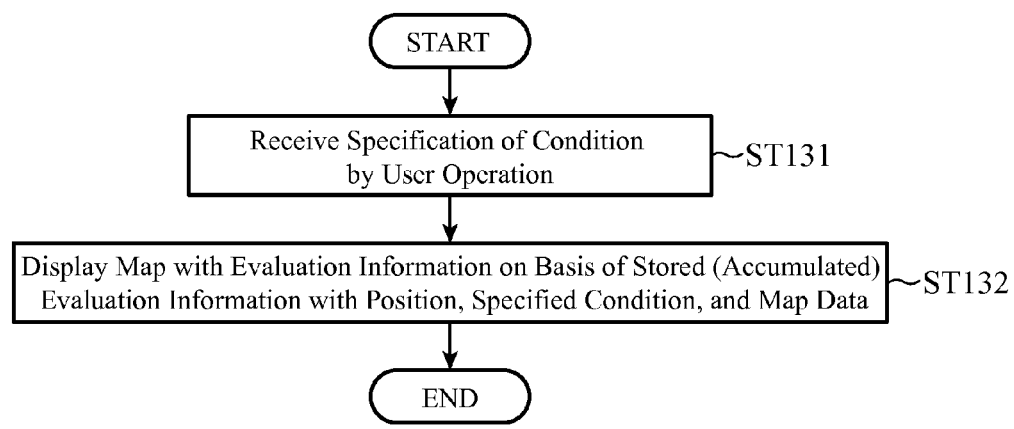
FIG. 27 is a flow chart showing an operation at the time of use of evaluation information with position which is performed by the navigation device in accordance with Embodiment 8.

Next, the operation of the navigation device in accordance with Embodiment 8 constructed as above will explained. FIG. 27 is a flow chart showing the operation at the time of use of evaluation information with position which is performed by the navigation device in accordance with Embodiment 8. Because the operation at the time of registration is the same as that explained in Embodiments 4 to 7, the explanation of the operation will be omitted.

The operation at the time of use will be explained with reference to FIG. 27. First, the condition specifier 82 accepts specification of a condition from a user's input operation (step ST131). The user is enabled to input a condition freely and arbitrarily. For example, the user can input a date or a time zone when he or she is scheduled to go out, input "rain" when he or she desires to search for a location for which evaluation information of "good" was provided even when it is raining, or input "car" as the usage pattern when he or she desires the navigation device to present only an evaluation result about the usage pattern of "car."

The map display unit 11 then displays a map with evaluation information which is limited only to evaluation information with position matching the specified condition inputted in step ST131 on the screen, such as the display, on the basis of both evaluation information with position which is stored in an evaluation information with position storage 9 and to which condition information is added, and map data stored in a map data storage 12 (step ST132).

As mentioned above, the navigation device in accordance with this Embodiment 8 can check to see, in advance, only evaluation information with position stored with a condition being added to the evaluation information with position according to the condition, such as a specific date and time or weather, by specifying a date and time when the user is scheduled to pass through the neighborhood of a point, weather, or the like as one of various conditions. Further, according to a condition, such as users having similar interests or users having a specific attribute, the navigation device can acquire only evaluation information with position stored with the condition being added from the registered pieces of user information and so on. Further, when searching for only pieces of evaluation information of "good", the user is also enabled to make the navigation device display only pieces of good evaluation information by specifying evaluation information of "good" as a specified condition.

Embodiment 9

Figure 28:
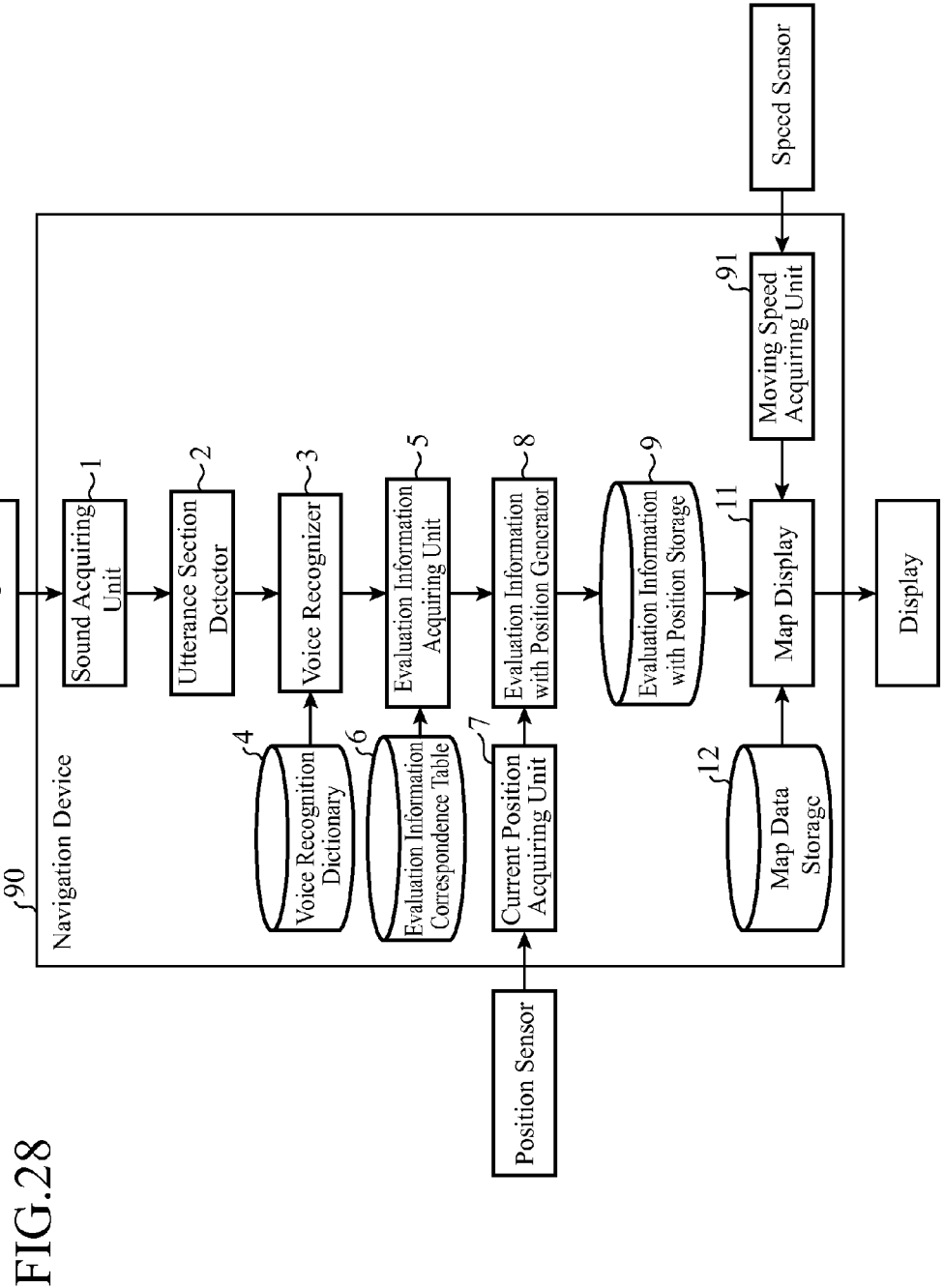
FIG. 28 is a block diagram showing an example of a navigation device in accordance with Embodiment 9.

FIG. 28 is a block diagram showing an example of a navigation device in accordance with Embodiment 9 of the present invention. The same structural components as those explained in Embodiments 1 to 8 are designated by the same reference numerals, and the duplicated explanation of the components will be omitted hereafter. The navigation device 90 in accordance with Embodiment 9 shown hereafter further includes a moving speed acquiring unit 91 as compared with the navigation device 10 in accordance with Embodiment 1.

The moving speed acquiring unit 91 acquires the speed of a vehicle (moving object) on the basis of a speed sensor of the vehicle. As the speed sensor, the speed sensor of the vehicle can be used. As an alternative, the speed can be calculated and acquired from time information and position information of GPS data, like in a case in which time information and position information are used by a GPS speed meter.

Then, when the speed of the moving object acquired by the moving speed acquiring unit 91 is higher than a predetermined value, a map display unit 11 judges that the user's driving condition is during travel and it is dangerous to display a map to which various pieces of information are added and hence make the map essentially intended for guidance unclear, and displays map data to which no evaluation information with position is added. In contrast, when the speed of the moving object is equal to or lower than the predetermined value, the map display unit judges that the user's driving condition is at rest, and displays map data to which evaluation information with position is added.

Figure 29:
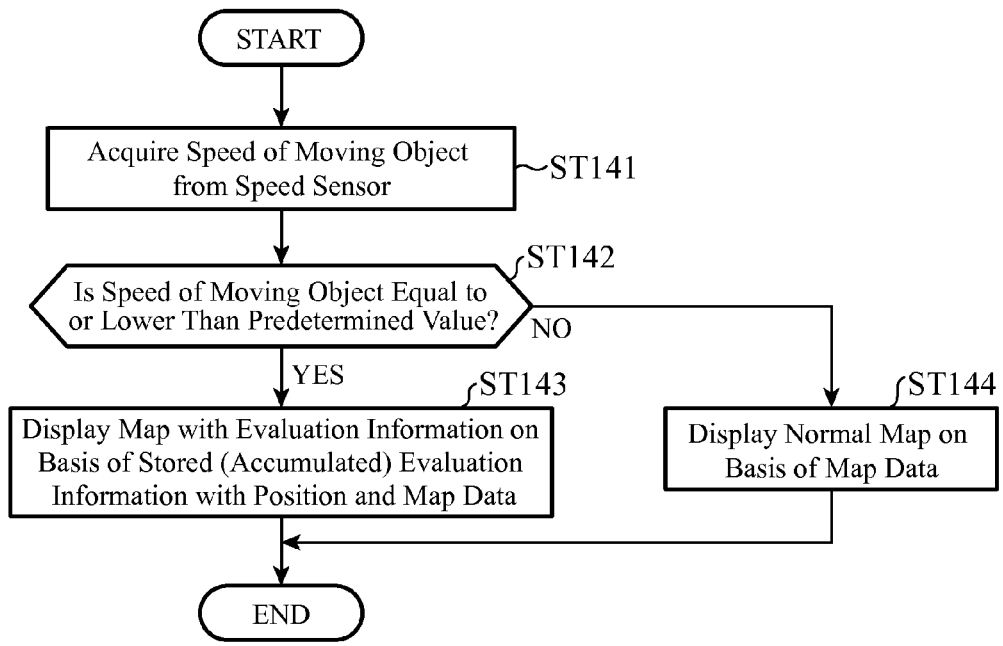
FIG. 29 is a flow chart showing an operation at the time of use of evaluation information with position which is performed by the navigation device in accordance with Embodiment 9.

Next, the operation of the navigation device in accordance with Embodiment 9 constructed as above will explained. FIG. 29 is a flow chart showing the operation at the time of use of evaluation information with position which is performed by the navigation device in accordance with Embodiment 9. Because the operation at the time of registration is the same as that shown in FIG. 3 in Embodiment 1, the explanation of the operation will be omitted.

The operation at the time of use will be explained with reference to FIG. 29. The moving speed acquiring unit 91 acquires the moving speed from a signal acquired from the speed sensor or the like (step ST141). The map display unit 11 determines whether or not the moving speed acquired from the moving speed acquiring unit 91 is equal to or lower than the predetermined value (e.g., 10 km/h) (step ST142).

Then, when the moving speed is equal to or lower than the predetermined value (when YES in step ST142), the map display unit 11 displays a map with evaluation information on a screen, such as a display, on the basis of map data stored in a map data storage 12 in advance and evaluation information with position which is generated in step ST7 (step ST143), like in the case of step ST11 shown in FIG. 4 in Embodiment 1. In contrast, when the moving speed is higher than the predetermined value (when NO in step ST142), the map display unit judges that it is dangerous to display a map to which various pieces of information are added and hence make the map essentially intended for guidance unclear, and only displays a normal map to which no evaluation information with position is added (step ST144).

Although the example of displaying map data to which no evaluation information with position is added when the speed of the moving object is higher than the predetermined value is explained in this Embodiment 9, the map data can be displayed by adding evaluation information with position to the map data by using a presenting method of making the evaluation information with position inconspicuous, such as a method of displaying the evaluation information with position in a light color, or a method of displaying only evaluation information with position whose number is large. It can be considered that when presenting evaluation information with position while making this evaluation information with position less obtrusive in this way, the safety is maintained with the evaluation information with position being not obstructive to the user even if the driving condition is during travel.

As mentioned above, because the navigation device in accordance with this Embodiment 9 changes the presenting method according to whether or not the speed of the moving object is higher than the predetermined value, i.e., according to whether the user's driving condition is during travel or at rest, or the like, and does not add any evaluation information with position in such a way that it is not obstructive to the user when the driving condition is during travel, or presents evaluation information with position by adding this evaluation information with position by using a presenting method of making the evaluation information with position inconspicuous, the safety can be further maintained.

Embodiment 10

Figure 30:
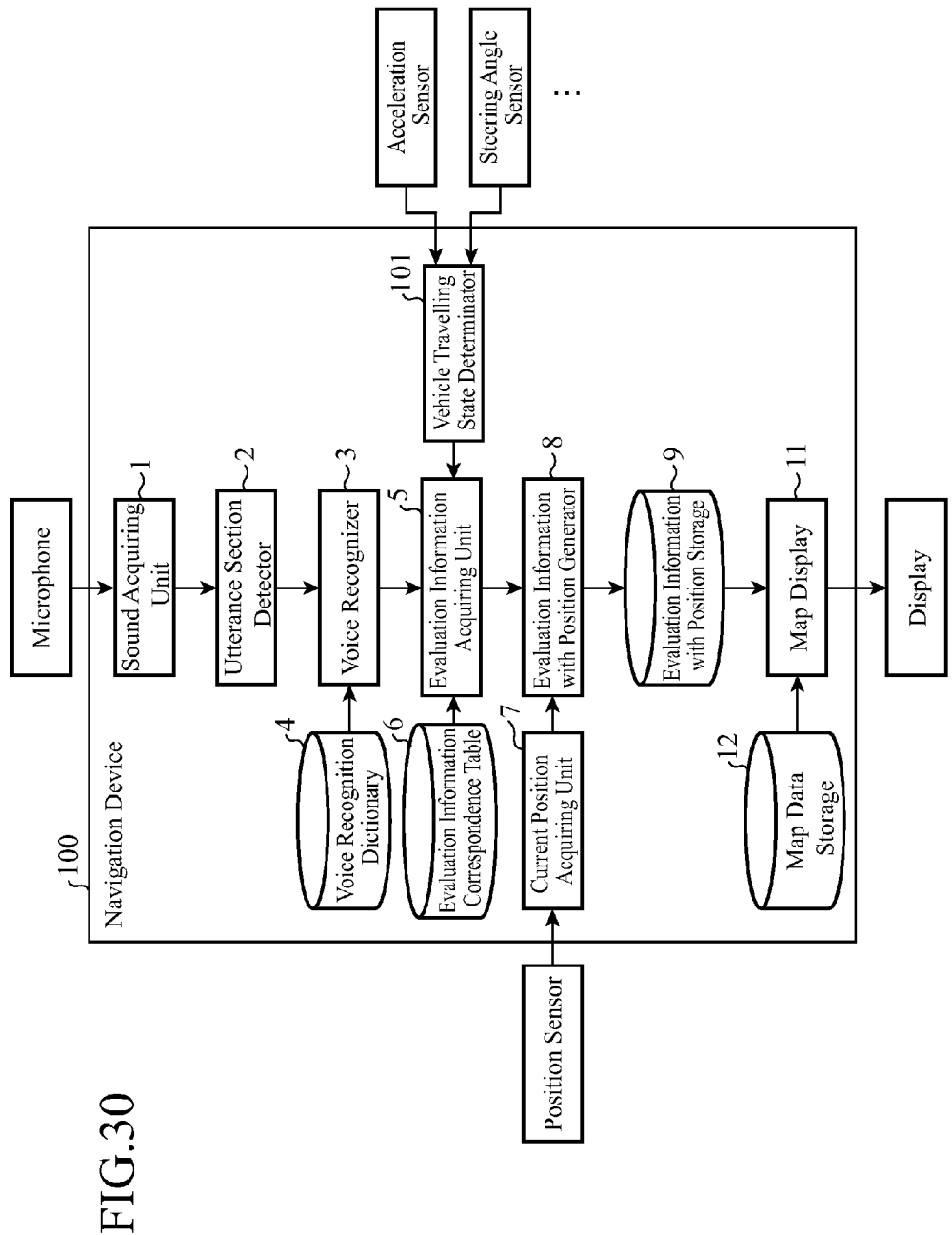
FIG. 30 is a block diagram showing an example of a navigation device in accordance with Embodiment 10.

FIG. 30 is a block diagram showing an example of a navigation device in accordance with Embodiment 10 of the present invention. The same structural components as those explained in Embodiments 1 to 9 are designated by the same reference numerals, and the duplicated explanation of the components will be omitted hereafter. The navigation device 100 in accordance with Embodiment 10 shown hereafter further includes a vehicle travelling state determinator 101 as compared with the navigation device 10 in accordance with Embodiment 1.

The vehicle travelling state determinator 101 determines a vehicle travelling state, such as sudden braking or sudden steering, from signals acquired from various sensors, such as an acceleration sensor and a steering angle sensor.

An evaluation information correspondence table 6 includes key words each of which can result in evaluation information of "good" and also result in evaluation information of "bad", as shown in, for example, FIG. 31.

For example, when the interjection "Oh" is uttered, this key word being included in the evaluation information correspondence table 6 shown in FIG. 31, and being defined in advance in such away that, when whether the key word corresponds to "good" or "bad" cannot be determined from this correspondence table, the key word corresponds to the evaluation information of "good" when the vehicle travelling state is a sudden braking state, or corresponds to the evaluation information of "bad" when the vehicle travelling state is not a sudden braking state, an evaluation information acquiring unit 5 refers to the evaluation information correspondence table 6 to acquire evaluation information corresponding to the predetermined key word and based on the vehicle travelling state.

Figure 32:
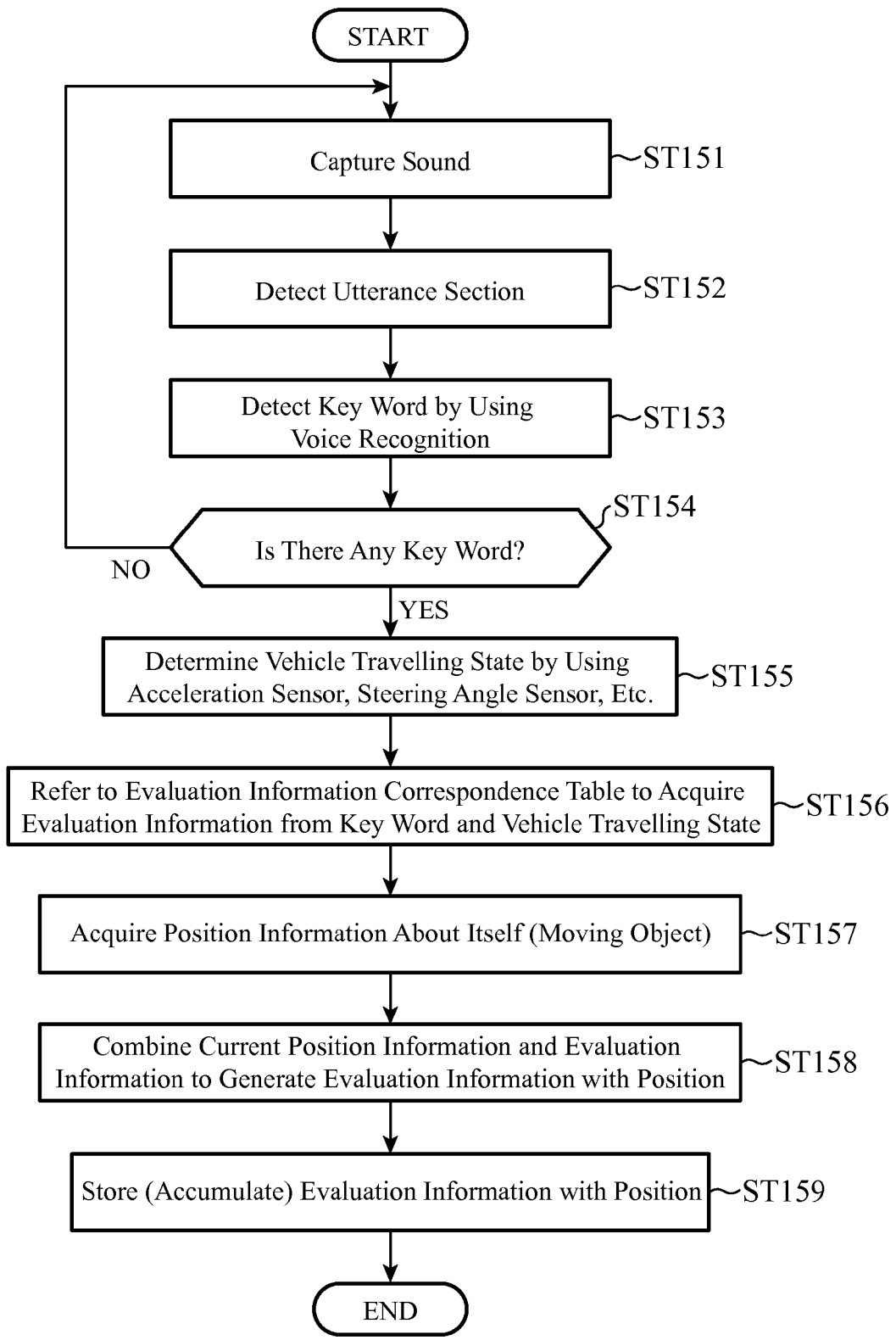
FIG. 32 is a flow chart showing an operation at the time of registration of evaluation information with position which is performed by the navigation device in accordance with Embodiment 10.

Next, the operation of the navigation device in accordance with Embodiment 10 constructed as above will explained. FIG. 32 is a flow chart showing the operation at the time of registration of evaluation information with position which is performed by the navigation device in accordance with Embodiment 10. Because the operation at the time of use is the same as that shown in FIG. 4 in Embodiment 1, the explanation of the operation will be omitted hereafter.

The operation at the time of registration will be explained with reference to FIG. 32. Because processes (steps ST151 to ST154) including up to a process of extracting a predetermined key word to determine whether or not a key word is included in a recognition result, which is performed by a voice recognizer 3, are the same as those of steps ST1 to ST4 of FIG. 3 in Embodiment 1, the explanation of the processes will be omitted hereafter. Then, when a key word is included in the recognition result (when YES in step ST154), the vehicle travelling state determinator 101 determines the vehicle travelling state from signals from the acceleration sensor, the steering wheel angle sensor, and so on (step ST155).

The evaluation information acquiring unit 5 then refers to the evaluation information correspondence table 6 to acquire evaluation information corresponding to the predetermined key word and based on the vehicle travelling state determined by the vehicle travelling state determinator 101 (step ST156). Because subsequent processes (step ST157 to ST159) including from acquisition of position information to storing of evaluation information with position are the same as those of steps ST6 to ST8 of FIG. 3 in Embodiment 1, the explanation of the processes will be omitted hereafter.

As a result, when making sudden braking or sudden steering or sounding the horn because of the occurrence of an emergent event, and so on, evaluation information with position can be left automatically. Further, even if the user makes an utterance having the same contents, an evaluation ("good" or "bad") according to an emergent event can be provided discriminately. In addition, the precision of mapping of the recognition result to evaluation information can be improved.

Even in case that the emergent event is very sudden, and therefore the user cannot utter any key word connected directly with an evaluation and it cannot be decided whether an evaluation of "good" or "bad" is provided only from the key word, an evaluation can be made on the basis of the vehicle travelling state.

Figure 33:
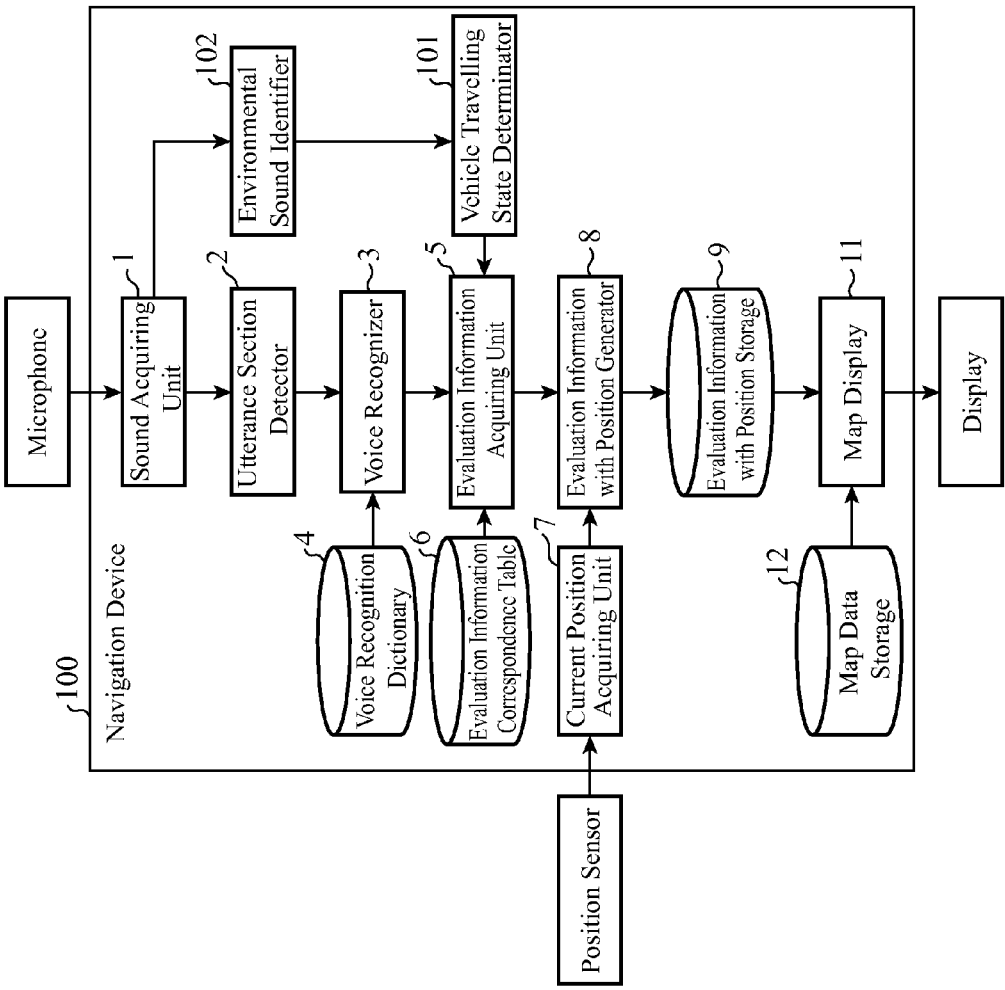
FIG. 33 is a block diagram showing another example of the navigation device in accordance with Embodiment 10.

Further, as shown in FIG. 33, the navigation device can further include an environmental sound identifier 102 so as to be able to identify a sound (environmental sound) in the surroundings of the vehicle (moving object), such as a sudden braking sound, a horn sound, slip noise of a tire, or collision noise, from a sound signal acquired by a sound acquiring unit 1. The vehicle travelling state determinator 101 then determines the vehicle travelling state on the basis of the identified environmental sound. Also in this case, the evaluation information acquiring unit 5 similarly refers to the evaluation information correspondence table 6 to acquire evaluation information corresponding to the predetermined key word and based on the vehicle travelling state. In the environmental sound identifying process, a typical HMM method according to a model which is customized to environmental sounds can be used.

As a result, not only when the driver of the vehicle brakes suddenly or turns the steering wheel suddenly, or sounds the horn because of the occurrence of an emergent event, but also when the driver of another vehicle travelling in the vicinity brakes suddenly or turns the steering wheel suddenly, or sounds the horn, the navigation device can leave evaluation information with position automatically by simply acquiring the sound. Further, even if the user makes an utterance have the same contents, an evaluation ("good" or "bad") according to an emergent event can be provided discriminately. In addition, the precision of mapping of the recognition result to evaluation information can be improved.

Embodiment 11

Figure 34:
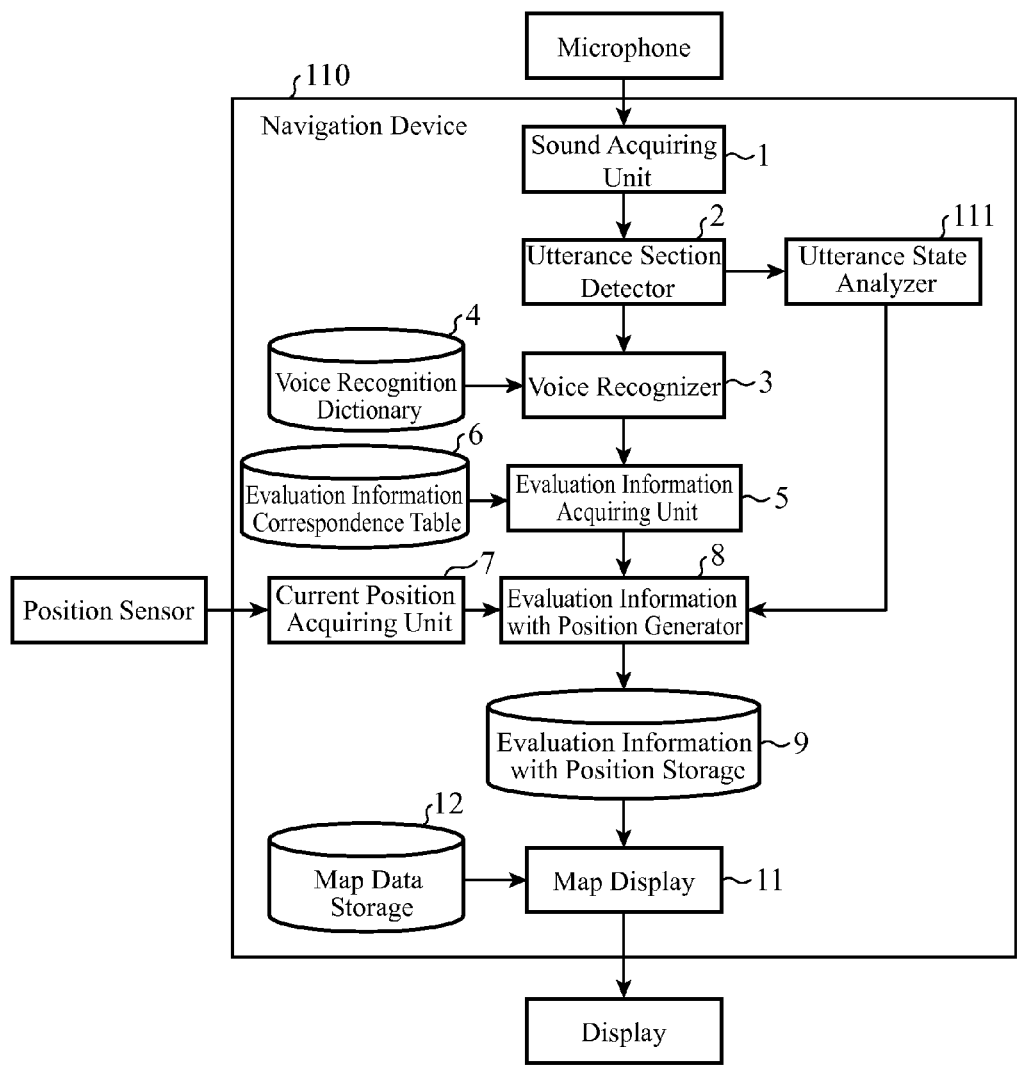
FIG. 34 is a block diagram showing an example of a navigation device in accordance with Embodiment 11.

FIG. 34 is a block diagram showing an example of a navigation device in accordance with Embodiment 11 of the present invention. The same structural components as those explained in Embodiments 1 to 10 are designated by the same reference numerals, and the duplicated explanation of the components will be omitted hereafter. The navigation device 110 in accordance with Embodiment 11 shown hereafter further includes an utterance state analyzer 111 as compared with the navigation device 10 in accordance with Embodiment 1.

The utterance state analyzer 111 analyzes voice data in an utterance section detected by an utterance section detector 2, analyzes at least one of the sound volume of the uttered voice, and prosody information, such as the strength, the length, or the pitch of the voice, and acquires information indicating that the sound volume or the prosody information is equal to or greater than a predetermined value, or that the sound volume or the prosody information is equal to or greater (or higher), by a predetermined value, than the user's average sound volume or average prosody information. As a result, when the sound volume of the voice is large or when there is a change of the prosody information, such as when the pitch becomes high, it can be judged that the user has uttered with a stronger emotion than that at the time of uttering ordinarily.

When generating evaluation information with position by combining current position information and evaluation information, an evaluation information with position generator 8 performs weighting and generates evaluation information with position on the basis of the sound volume or the prosody information acquired by the utterance state analyzer 111. For example, when the sound volume of the utterance is equal to or greater than the predetermined value, the evaluation information with position generator assigns a weight to the evaluation information with position, for example, handles the evaluation information with position as two pieces of evaluation information with position. Although the example of handling the evaluation information with position as two pieces of evaluation information with position as the weighting is shown above, the evaluation information with position can be alternatively handled as one and a half or three pieces. The number of pieces can be determined arbitrarily. For example, in the case of the sound volume of the utterance, the evaluation information with position is handled as two pieces when the sound volume is equal to or greater than a first predetermined value, and is handled as three pieces when the sound volume is equal to or greater than a second predetermined value.

Figure 35:
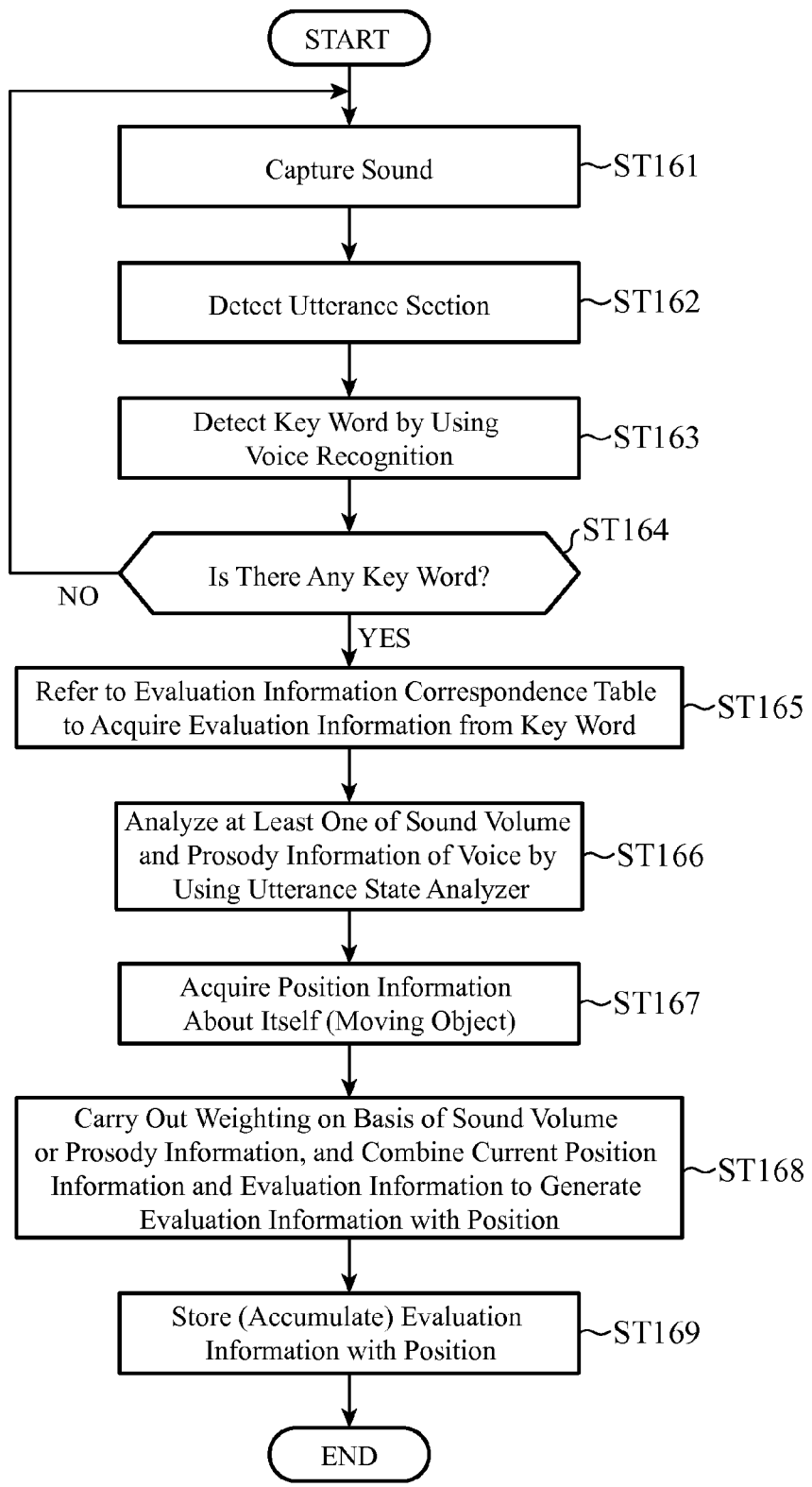
FIG. 35 is a flow chart showing an operation at the time of registration of evaluation information with position which is performed by the navigation device in accordance with Embodiment 11.

Next, the operation of the navigation device in accordance with Embodiment 11 constructed as above will explained. FIG. 35 is a flow chart showing the operation at the time of registration of evaluation information with position which is performed by the navigation device in accordance with Embodiment 11. Because the operation at the time of use is the same as that shown in FIG. 4 in Embodiment 1, the explanation of the operation will be omitted hereafter.

The operation at the time of registration will be explained with reference to FIG. 35. Because processes (steps ST161 to ST165) including up to the acquisition of evaluation information which is performed by an evaluation information acquiring unit 5 are the same as those of steps ST1 to ST5 of FIG. 3 in Embodiment 1, the explanation of the operation will be omitted hereafter. The utterance state analyzer 111 then analyzes the voice data in the utterance section detected by the utterance section detector 2, and analyzes at least one of the sound volume and the prosody information of the uttered voice (step ST166). A current position acquiring unit 7 then acquires the current position information of a vehicle (moving object) on the basis of information from a position sensor (step ST167).

When generating evaluation information with position by combining the current position information acquired by the current position acquiring unit 7 in step ST167, the evaluation information with position generator 8 performs weighting to generate evaluation information with position on the basis of the sound volume or the prosody information of the voice analyzed by the utterance state analyzer 111 in step ST166 (step ST168). The navigation device then stores the generated evaluation information with position in an evaluation information with position storage 9 (step ST169). More specifically, the navigation device carries out weighting according to the state of the utterance on the evaluation information acquired in step ST165, and also links the evaluation information with the point for which the evaluation is made and stores the evaluation information.

As mentioned above, the navigation device in accordance with this Embodiment 11 can carry out an evaluation according to the emotion which the user has at the time of uttering by taking into consideration the sound volume or the prosody information of the user's uttered voice. For example, the navigation device stores the evaluation information as two pieces of evaluation information when it is judged that the user has uttered with a stronger emotion at the time of uttering.

Although the navigation device in accordance with any one of above-mentioned Embodiments 3 to 6 and 8 toll is the one in which structural components are further added to the navigation device 10 in accordance with Embodiment 1 is explained above, it is needless to say that those structural components can be added to the navigation device 20 in accordance with Embodiment 2.

Further, although the example of applying the navigation device in accordance with the present invention to a moving object, such as a vehicle, is explained in the above-mentioned embodiments, this navigation device is not limited to the one for vehicles and the present invention can also be applied to various navigation devices for moving objects including a person, a vehicle, a rail car, a ship, and an airplane. Further, the present invention can be applied not only to a navigation device mounted in a moving object, such as a vehicle, but also to any type of device, such as a navigation device, which is installed in a smart phone, a tablet PC, a mobile phone, or the like.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

The navigation device in accordance with the present invention can be applied to various navigation devices for moving objects including a person, a vehicle, a rail car, a ship, and an airplane.

EXPLANATIONS OF REFERENCE NUMERALS

1 sound acquiring unit, 2 utterance section detector, 3 voice recognizer, 4 voice recognition dictionary, 5 evaluation information acquiring unit, 6 evaluation information correspondence table, 7 current position acquiring unit, 8 evaluation information with position generator, 9 evaluation information with position storage, 10, 20, 30, 40, 50, 60, 70, 80, 90, 100, and 110 navigation device, 11 map display unit, 12 map data storage, 13 display screen, 14 vehicle mark, 15 path mark, 16 balloon, 17 region showing evaluation information of "good", 18 region showing evaluation information of "bad", 19 evaluation information with position analyzer, 21 information transmitter, 22 information receiver, 23 evaluation information with position storage, 24 server for navigation, 31 moving path acquiring unit, 32 moving path, 41 date and time information acquiring unit, 51 weather information acquiring unit, 61 usage pattern acquiring unit, 71 operation history storage, 72 user information storage, 73 user attribute analyzer, 81 condition information acquiring unit, 82 condition specifier, 91 moving speed acquiring unit, 101 vehicle travelling state determinator, 102 environmental sound identifier, 111 utterance state analyzer.

The invention claimed is:
1. A navigation device that provides guidance on a moving route and displays map data on a display screen on a basis of map data and a position of a moving object, said navigation device comprising:
 a sound acquiring device that acquires a sound signal;
 an utterance section detector that detects an utterance section of a user's uttered voice from the sound signal acquired by said sound acquiring device to extract voice data;

a voice recognizer that regularly recognizes the voice data extracted by said utterance section detector to extract a predetermined key word after said navigation device has been started;

an evaluation information acquiring device that refers to an evaluation information correspondence table in which a plurality of key words are brought into correspondence with an evaluation for each of said key words in advance to acquire evaluation information corresponding to the predetermined key word extracted by said voice recognizer;

a current position acquiring device that acquires a current position of said moving object;

an evaluation information with position generator that combines the evaluation information acquired by said evaluation information acquiring device and the current position acquired by said current position acquiring device to generate evaluation information with position;

an evaluation information with position storage that stores the evaluation information with position generated by said evaluation information with position generator; and a map display unit that adds predetermined evaluation information with position stored in said evaluation information with position storage to said map data, and that also displays the map data to which said evaluation information with position is added on said display screen.

2. The navigation device according to claim 1, wherein said navigation device further includes a moving path acquiring unit that acquires the current position which corresponds to the utterance section detected by said utterance section detector and which is acquired by said current position acquiring device as a moving path along which said moving object has moved during said user's utterance, and wherein said evaluation information with position generator combines the evaluation information acquired by said evaluation information acquiring device and the moving path acquired by said moving path acquiring unit to generate said evaluation information with position.

3. The navigation device according to claim 1, wherein said navigation device further includes a date and time information acquiring unit that acquires current date and time information, and wherein said evaluation information with position generator adds the current date and time information acquired by said date and time information acquiring unit to generate said evaluation information with position, and said map display unit displays map data to which only evaluation information with position in which the current date and time acquired by said date and time information acquiring unit matches the date and time information added to said evaluation information with position is added on said display screen.

4. The navigation device according to claim 1, wherein said navigation device further includes a weather information acquiring unit that acquires current weather information, and wherein said evaluation information with position generator adds the current weather information acquired by said weather information acquiring unit to generate said evaluation information with position, and said map display unit displays map data to which only evaluation information with position in which the current weather acquired by said weather information acquiring unit matches the weather information added to said evaluation information with position is added on said display screen.

5. The navigation device according to claim 1, wherein said navigation device further includes a usage pattern acquiring unit that acquires a usage pattern of said moving object, and wherein said evaluation information with position generator adds the usage pattern of said moving object acquired by said usage pattern acquiring unit to generate said evaluation information with position, and said map display unit displays map data to which only evaluation information with position in which the usage pattern of said moving object acquired by said usage pattern acquiring unit matches the usage pattern added to said evaluation information with position is added on said display screen.

6. The navigation device according to claim 1, wherein on a basis of both the current position acquired by said current position acquiring unit and the evaluation information with position stored in said evaluation information with position storage, said map display unit displays map data to which said evaluation information with position is added on said display screen when passing through a point, a region, or its neighborhood for which said evaluation information with position is registered, or only when it is scheduled to pass through the point, the region, or its neighborhood.

7. The navigation device according to claim 1, wherein said navigation device further includes an evaluation information with position analyzer that analyzes a number of pieces of evaluation information with position stored in said evaluation information with position storage, and wherein said map display unit displays map data to which said evaluation information with position is added on said display screen on a basis of an analysis result acquired by said evaluation information with position analyzer.

8. The navigation device according to claim 1, wherein said navigation device further includes a condition information acquiring unit that acquires at least one condition from among current date and time information, weather information, a usage pattern of said moving object, and a user attribute, and a condition specifier that allows said user to specify at least one condition from among the date and time information, the weather information, the usage pattern of the moving object, the user attribute, and a type of said evaluation information, and wherein said evaluation information with position generator adds said condition acquired by said condition information acquiring unit to generate said evaluation information with position, and said map display unit displays map data to which only evaluation information with position in which the condition specified by said condition specifier matches the condition added to said evaluation information with position is added on said display screen.

9. The navigation device according to claim 1, wherein said navigation device further includes a moving speed acquiring unit that acquires a speed of said moving object, and wherein said map display unit displays map data to which said evaluation information with position is not added when the speed of the moving object acquired by said moving speed acquiring unit is higher than a predetermined value.

10. The navigation device according to claim 1, wherein said navigation device further includes a moving speed acquiring unit that acquires a speed of said moving object, and wherein said map display unit adds said evaluation information with position by using a presenting method of making said evaluation information with position inconspicuous and displays map data when the speed of the moving object acquired by said moving speed acquiring unit is higher than a predetermined value.

11. The navigation device according to claim 1, wherein said moving object is a vehicle and said navigation device further includes a vehicle travelling state determinator that determines a travelling state of said vehicle, and wherein said evaluation information acquiring unit refers to said evaluation information correspondence table to acquire evaluation information which corresponds to said predetermined key word and which is based on the vehicle travelling state determined by said vehicle travelling state determinator.

12. The navigation device according to claim 11, wherein said navigation device further includes an environmental sound identifier that identifies a sound in surroundings of said moving object from the sound signal acquired by said sound acquiring unit, and wherein said vehicle travelling state determinator determines said vehicle travelling state on a basis of the sound in the surroundings of said moving object identified by said environmental sound identifier.

13. The navigation device according to claim 1, wherein said navigation device further includes an utterance state analyzer that analyzes the voice data in the utterance section detected by said utterance section detector and analyzes at least one of a sound volume and prosody information of said user's uttered voice, and, when generating said evaluation information with position, said evaluation information with position generator performs weighting and generates the evaluation information with position on a basis of the sound volume or the prosody information acquired by said utterance state analyzer.

14. A navigation device that provides guidance on a moving route and displays map data on a display screen on a basis of map data and a position of a moving object, said navigation device comprising:
a sound acquiring device that acquires a sound signal;
an utterance section detector that detects an utterance section of a user's uttered voice from the sound signal acquired by said sound acquiring device to extract voice data;
a voice recognizer that regularly recognizes the voice data extracted by said utterance section detector to extract a predetermined key word after said navigation device has been started;
an evaluation information acquiring device that refers to an evaluation information correspondence table in which a plurality of key words are brought into correspondence with an evaluation for each of said key words in advance to acquire evaluation information corresponding to the predetermined key word extracted by said voice recognizer;
a current position acquiring device that acquires a current position of said moving object;
an evaluation information with position generator that combines the evaluation information acquired by said evaluation information acquiring device and the current position acquired by said current position acquiring device to generate evaluation information with position;
an information transmitter that transmits the evaluation information with position generated by said evaluation information with position generator to a server on a network;
an information receiver that receives predetermined evaluation information with position from the server on said network; and
a map display unit that adds the evaluation information with position acquired by said information receiver to said map data, and that also displays the map data to which said evaluation information with position is added on said display screen.

15. The navigation device according to claim 14, wherein said navigation device further includes an operation history storage that stores a history of operations performed by said user, a user information storage that stores user information including at least said user's gender and age, and a user attribute analyzer that analyzes a user attribute on a basis of the user operation history stored in said operation history storage and the user information stored in said user information storage, and wherein said evaluation information with position generator adds the user attribute analyzed by said user attribute analyzer to generate said evaluation information with position, said information transmitter transmits the evaluation information with position to which said user attribute is added to the server on said network, and said information receiver receives evaluation information with position in which the user attribute analyzed by said user attribute analyzer matches the user attribute added to said evaluation information with position from the server on said network.

* * * * *